United States Patent
Torata et al.

[11] Patent Number: 6,103,421
[45] Date of Patent: Aug. 15, 2000

[54] PROCESS OF PRODUCING A POSITIVE ELECTRODE ACTIVE MATERIAL AND NONAQUEOUS SECONDARY BATTERY USING THE SAME

[75] Inventors: Naoto Torata, Kitakatsuragi-gun; Takehito Mitate, Yamatotakada; Kazuaki Minato, Osaka, all of Japan

[73] Assignee: Sharp Kabushiki Kaisha, Osaka, Japan

[21] Appl. No.: 08/939,104

[22] Filed: Sep. 26, 1997

[30] Foreign Application Priority Data

Sep. 27, 1996 [JP] Japan .................................. 8-257135
May 22, 1997 [JP] Japan .................................. 9-131842

[51] Int. Cl.[7] .............................. H01M 4/04; H01M 4/26
[52] U.S. Cl. ................ 429/223; 429/231.95; 429/231.1; 423/140; 423/594
[58] Field of Search ............................. 429/223, 231.95, 429/231.1; 423/594, 140

[56] References Cited

U.S. PATENT DOCUMENTS

| | | | |
|---|---|---|---|
| 5,370,948 | 12/1994 | Hasegawa et al. | 429/223 |
| 5,565,688 | 10/1996 | Hayashi | 252/182.1 |
| 5,742,070 | 4/1998 | Hayashi et al. | 252/182.1 |

FOREIGN PATENT DOCUMENTS

| | | |
|---|---|---|
| 5-251079 | of 1993 | Japan . |
| 6-44970 | of 1994 | Japan . |
| 6-44971 | of 1994 | Japan . |
| 6-96769 | of 1994 | Japan . |
| 7-307165 | of 1995 | Japan . |
| 08045506 | 2/1996 | Japan . |
| WO 94/00385 | 1/1994 | WIPO . |

OTHER PUBLICATIONS

Quantitative Chemical Analysis, 4th Edition, by Daniel C. Harris. W.H. Freeman and Company, New York, 1982.

*Primary Examiner*—Maria Nuzzolillo
*Assistant Examiner*—Mark Ruthkosky
*Attorney, Agent, or Firm*—Nixon & Vanderhye P.C.

[57] ABSTRACT

A process of preparing a positive electrode active material for a nonaqueous secondary battery, comprising: making a buffered aqueous solution of a water-soluble lithium compound and a water-soluble nickel compound having a definite pH, reacting with oxalic acid and a water-soluble lithium compound and a water-soluble nickel compound to yield a co-precipitate of a slightly water-soluble salt of lithium and nickel in the resulting aqueous solution, followed by calcination.

29 Claims, 14 Drawing Sheets

PROCESS OF PRODUCING A POSITIVE ELECTRODE ACTIVE MATERIAL AND NONAQUEOUS SECONDARY BATTERY USING THE SAME

BACKGROUND OF THE INVENTION

1. Field of the Invention

The present invention relates to a process of producing a positive electrode active material for positive electrode.

2. Related Art

In the Japanese Unexamined Patent Publication (Kokai) No. Hei 05(1993)-251,079, solid lithium nitrate is mixed with at least one of solid nickel hydroxide and nickel oxyhydroxide and calcined at 500° C. to 1000° C. whereupon $LiNiO_2$ is manufactured.

In the Japanese Unexamined Patent Publication (Kokai) No. Hei 06(1994)-044,970, lithium nickel composite oxide is manufactured as follows. To a saturated aqueous solution containing at least one nickel salt selected from nickel halide, nickel sulfate, nickel phosphate, nickel acetate and nickel oxalate is added a saturated aqueous solution containing at least one lithium salt selected from lithium hydroxide, lithium carbonate and lithium hydrogencarbonate where said lithium salt is equimolar to the above nickel salt. The mixed solution is then evaporated to dryness with stirring and mixing in air or in vacuo and the resulting caky solid mixture is calcined at 600° C. to 800° C. whereupon a lithium nickel composite oxide is manufactured.

In the Japanese Unexamined Patent Publication (Kokai) No. Hei 06(1994)-044,971, lithium nickel composite oxide is manufactured as follows. To at least one powdery nickel compound which is slightly soluble or insoluble in water selected from nickel oxide, nickel oxyhydroxide, nickel hydroxide and nickel carbonate is added a saturated aqueous solution of at least one lithium salt selected from lithium halide, lithium nitrate, lithium sulfate, lithium phosphate, lithium borate, lithium acetate and lithium oxalate followed by well kneading. This mixture is evaporated to dryness with stirring in air or in vacuo and the resulting caky solid mixture is calcined at 600° C. to 800° C. whereupon a lithium nickel composite oxide is manufactured.

In the Japanese Unexamined Patent Publication (Kokai) No. Hei 06(1994)-096,769, $Li_xNiO_2$ is manufactured as follows. A lithium source and a nickel source are mixed so as to make the molar ratio of lithium in the lithium source to nickel in the nickel source 1:1. At that time, a small amount of water is added as a dispersion medium to the mixture. The resulting mixture is dried and calcined at 650° C. to 800° C. whereupon $Li_xNiO_2$ is manufactured.

In the Japanese Unexamined Patent Publication (Kokai) No. Hei 07(1995)-3,071,651, $Li_xNiO_2$ is manufactured as follows. A nickel compound is dispersed in a solution of lithium nitrate followed by evaporating a solvent. The mixture of lithium nitrate and the nickel compound is calcined in an atmosphere containing oxygen whereupon $Li_xNiO_2$ is manufactured.

However, in the manufacturing process of $Li_xNiO_2$ mentioned in the Japanese Unexamined Patent Publication (Kokai) No. Hei 05(1993)-251,079, a lithium compound and a nickel compound in a solid state are mixed and, therefore, it is difficult to mix them homogeneously.

In the manufacturing process of a lithium nickel composite oxide mentioned in the Japanese Unexamined Patent Publication (Kokai) No. Hei 06(1994)-044,970, lithium compound and nickel compound are mixed in a state of aqueous solution. However, in the steps of drying and solidifying the aqueous solution, deposition of the solutes does not take place simultaneously because solubilities of the solutes are different. Accordingly, in the resulting caky solid mixture, the lithium and nickel compounds are hardly mixed homogeneously.

In the manufacturing process of lithium nickel composite oxide mentioned in the Japanese Unexamined Patent Publication (Kokai) No. Hei 06(1994)-044,971 and processes of $Li_xNiO_2$ mentioned in the Japanese Unexamined Patent Publication (Kokai)s Nos. Hei 06(1994)-096,769 and Hei 07(1995)-3,071,651, a mixing is conducted using water as a dispersion medium. However, in drying the mixture, the substances dissolved in the dispersion medium are not deposited uniformly. Therefore, the lithium compound and the nickel compound are not well mixed in the resulting mixture.

In a nonaqueous secondary battery where $Li_xNiO_2$ obtained by calcining a mixture which is not sufficiently mixed is used as a positive electrode active material, a discharge capacity (hereinafter, just referred to as "capacity") significantly decreases upon repeated charging/discharging operations and the electrodes are quickly deteriorated.

SUMMARY OF THE INVENTION

The present invention provides a process of preparing a positive electrode active material for a nonaqueous secondary battery, comprising: making a buffered aqueous solution of a water-soluble lithium compound and a water-soluble nickel compound having a definite pH, and reacting with oxalic acid and a water-soluble lithium compound and a water-soluble nickel compound to yield a co-precipitate of a slightly water-soluble salt of lithium and nickel in the resulting aqueous solution.

The present invention also provides a process of preparing a positive electrode active material for a nonaqueous secondary battery, comprising: dissolving a water-soluble lithium compound and a water-soluble nickel compound in a buffer solution to prepare a uniform aqueous solution having a definite pH, and reacting with oxalic acid and a water-soluble lithium compound and a water-soluble nickel compound to co-precipitate a slightly water-soluble lithium salt and nickel salt, isolating the obtained co-precipitate, and calcining the isolated co-precipitate in the resulting aqueous solution.

The present invention also provides a co-precipitate, comprising a composite oxalate of lithium and nickel or a mixture of lithium oxalate, nickel oxalate and a composite oxalate of lithium and nickel and shows two thermal decomposition peaks around 300–350° C. in DTA-TG measurement, the co-precipitate prepared by co-precipitation from a buffered aqueous solution of a water-soluble lithium compound and a water-soluble nickel compound having a definite pH.

When used for a nonaqueous secondary battery, the positive electrode active material exhibits an improved charging/discharging cycle life.

DETAILED DESCRIPTION OF THE PREFERRED EMBODIMENT

The positive electrode active material prepared according to the present invention can be represented by the formula $Li_xNiO_2$ or $Li_xNi_{1-y}M_yO_2$. In the formula, X is preferably $0.8 \leq X \leq 1.2$, more preferably $1.0 \leq X \leq 1.1$. Y is preferably $0 < Y < 0.5$. M is an element selected from the group consisting of transition metals and elements of the group 2B, 3B, 4B and 5B (except Ni). Specific examples of the elements are Ti, V, Cr, Mn, Fe, Co, Cu, Zn, Y, Zr, La, Al, In, Sn, Pb and Sb. The performance of a battery may be improved if the positive electrode active material contains this element(M).

According to the process of preparing a positive electrode active material for a nonaqueous secondary battery of the present invention, the co-precipitate containing lithium and nickel mixed homogeneously is produced by co-precipitation reaction of oxalic acid, a water-soluble lithium compound and a water-soluble nickel compound in a buffered aqueous solution used in order to stabilize pH of the solution when adding oxalic acid to a system for co-precipitation reaction of oxalic acid, the water-soluble lithium compound and the water-soluble nickel compound. The buffered aqueous solution suppresses remarkable change in pH before adding oxalic acid, during reaction and after reaction. Moreover, by dissolving a water-soluble compound of a transition metal or a element of the group 2B, 3B, 4B and 5B (except Ni) in the system, it is possible to produce a co-precipitate in which lithium, nickel and the element M are homogeneously mixed while keeping pH of the reaction system by use of the buffered aqueous solution. Such co-precipitate can produce $Li_xNi_{1-y}M_yO_2$ after calcination. Moreover, by mixing a solution prepared by dissolving oxalic acid and a solution prepared by dissolving a water-soluble lithium compound and a water-soluble nickel compound, it is possible to produce a co-precipitate.

Figure 1:
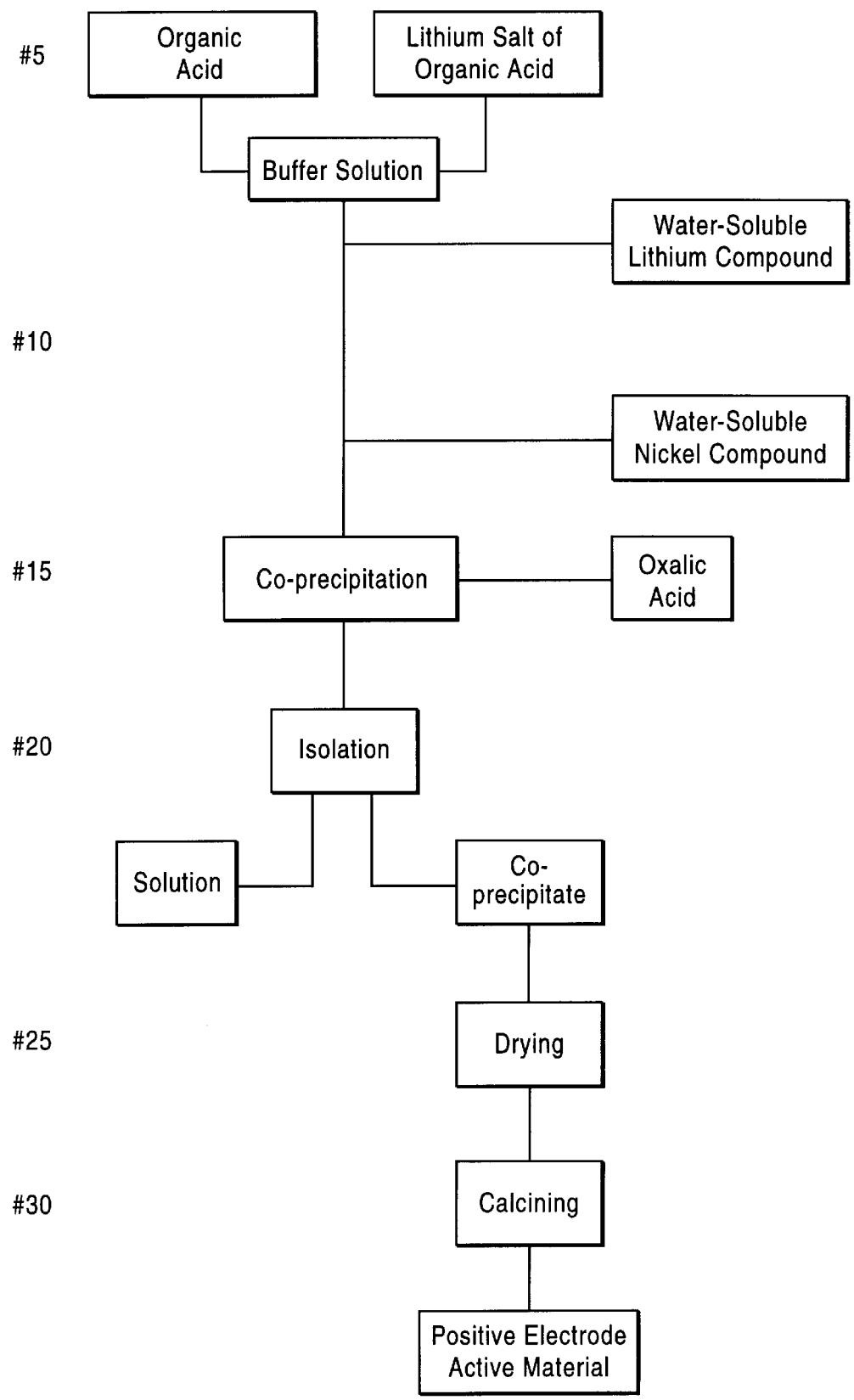
FIG. 1 shows a manufacturing process of a positive electrode active material in accordance with the present invention.

A process of producing $Li_xNiO_2$ in accordance with the present invention will be described below in detail as hereunder. FIG. 1 is a flow chart showing a process for the manufacture of $Li_xNiO_2$ according to the present invention. In step #5, an organic acid and its lithium salt are dissolved in water to prepare a buffer solution. Examples of the organic acids include acetic acid, lactic acid, tartaric acid, citric acid, succinic acid and phthalic acid, among which acetic acid is preferred in terms of cost. Examples of the lithium salts include lithium acetate, lithium lactate, lithium tartarate and lithium citrate, among which lithium acetate is preferred in terms of cost.

Preferably, each of the molar amounts of the organic acid and its lithium salt is 3 to 30 times as much as a molar amount of a water-soluble nickel compound to be dissolved in the buffer at later step #10. If the above condition is satisfied, pH in the solution is stable and $Li_xNiO_2$ having sufficient crystallinity may be obtained. If the molar amount of the organic acid and its lithium salt is less than 3 times, it is difficult to obtain $Li_xNiO_2$ after the calcination because pH in the solution is unstable. If the molar amount of the organic acid and its lithium salt is 30 or more times, it is not preferred in terms of cost.

The molar amount of its lithium salt to be used is 0.25 to 10 times as much as the molar amount of the organic acid. If the molar amount of its lithium salt is less than 0.25 times, it is not preferred because the slightly water-soluble lithium salt may not be co-precipitated easily. If the molar amount of its lithium salt is 10 or more times, it is not preferred in terms of cost.

In a step #10, a uniform aqueous solution (a buffered aqueous solution) is prepared by dissolving a water-soluble lithium compound and a water-soluble nickel compound in the buffer solution prepared in the step #5. Examples of the water-soluble lithium compound include lithium chloride, lithium bromide, lithium iodide, lithium chlorate, lithium perchlorate, lithium bromate, lithium iodate, lithium hydroxide, lithium sulfide, lithium hydrogensulfide, lithium sulfate, lithium nitrate, lithium dihydrogenphosphate, lithium hydrogencarbonate, lithium thiocyanate, lithium tetraborate, lithium acetate, etc. Among them, lithium nitrate, lithium hydroxide, lithium chloride, lithium sulfate, lithium acetate, lithium bromide or lithium iodide is preferred, because they are less likely to remain as impurities in the resulting product after the calcination than other water-soluble lithium compounds.

Examples of the water-soluble nickel compound include nickel chloride, nickel perchlorate, nickel bromide, nickel iodide, nickel sulfate, nickel selenate, nickel nitrate, nickel thiocyanate, nickel acetate, etc. Among them, nickel nitrate, nickel chloride, nickel sulfate, nickel bromide, nickel iodide, or nickel acetate is preferred in terms of cost. The molar ratio of the water-soluble nickel compound to the water-soluble lithium compound to be dissolved in the buffer solution is preferably 1:0.7 to 1:3.0 (water-soluble lithium compound/ water-soluble nickel compound molar ratio=0.7 to 3). If the water-soluble lithium compound/water-soluble nickel compound molar ratio is lower than 0.7, the $Li_xNiO_2$ is hardly obtained after the calcination because the amount of slightly water-soluble lithium sat in the co-precipitate mixture decreases. If the water-soluble lithium compound/water-soluble nickel compound molar ratio is more than 3.0, it is not preferred because a lot of impurities are mingled at the same time when $Li_xNiO_2$ is obtained.

In the process of producing $Li_xNi_{1-Y}M_YO_2$ ($0.8 \leq X \leq 1.2$, $0<Y<0.5$, M is an element selected from the group consisting of transition metals and elements of the group 2B, 3B, 4B and 5B(except Ni)), another water-soluble compound containing the element M may be added to the above-mentioned buffer solution. Examples of such compound include titanium chloride, titanium bromide, titanium iodide, titanium nitrate, vanadium chloride, vanadium bromide, vanadium iodide, vanadium acetate, chromium chloride, chromium nitrate, chromium acetate, manganese chloride, manganese bromide, manganese iodide, manganese nitrate, manganese acetate, iron chloride, iron bromide, iron iodide, iron sulfate, iron nitrate, iron acetate, cobalt chloride, cobalt bromide, cobalt iodide, cobalt sulfate, cobalt nitrate, cobalt acetate, copper sulfate, copper nitrate, copper acetate, zinc chloride, zinc bromide, zinc iodide, zinc sulfate, zinc nitrate, zinc acetate, yttrium chloride, yttrium bromide, yttrium iodide, yttrium sulfate, yttrium nitrate, yttrium acetate, zirconium sulfate, zirconium nitrate, lanthanum chloride, lanthanum bromide, lanthanum iodide, lanthanum sulfate, lanthanum nitrate, lanthanum acetate, aluminum chloride, aluminum bromide, aluminum iodide, aluminum nitrate, aluminum hydroacetate, indium chloride, indium bromide, indium iodide, indium sulfate, indium nitrate, tin chloride, tin bromide, tin iodide, tin sulfate, lead nitrate, antimony chloride, etc.

In the process of producing $Li_xNi_{1-Y}M_YO_2$, the water-soluble lithium compound, the water-soluble nickel compound and the compound containing the element M to be dissolved in the buffer solution are preferably weighed to adjust the molar ratio (Ni+M):Li to 1:0.7–1:3.0 [the Li/(Ni+M) molar ratio is 0.7 to 3.0]. If the amount of the water-soluble lithium compound in the buffer solution is small(the Li/(Ni+M) molar ratio is less than 0.7), $Li_xNi_{1-Y}M_YO_2$ is hardly obtained after the calcination. If the amount of the water-soluble lithium compound in the buffer solution is large(the Li/(Ni+M) molar ratio is bigger than 3.0), it is not preferred because a lot of impurities are mingled at the same time when $Li_xNi_{1-Y}M_YO_2$ is obtained. In a step #10 of FIG. 1, the buffered aqueous solution is prepared by dissolving the water-soluble lithium compound and the water-soluble nickel compound in the buffer solution prepared in the step #5. In the alternative way, the buffered aqueous solution is prepared by mixing an aqueous solution of the water-soluble lithium compound and the water-soluble nickel compound with the buffer solution.

In a step #15, oxalic acid is added to the aqueous solution of the water-soluble lithium compound and the water-soluble nickel compound prepared in the step #10 whereby a slightly water-soluble lithium salt and a slightly water-soluble nickel salt are co-precipitated. At this time, the slightly water-soluble lithium salt and slightly water-soluble nickel salt are mixed uniformly in the co-precipitate. Further, a molar ratio of lithium and nickel (Li/Ni) in the co-precipitate may be controlled by co-precipitation process performed in the buffer solution. Either solid or liquid oxalic acid may be used for the addition. If solid oxalic acid is added to the aqueous solution, the process of addition may be performed easily. If liquid oxalic acid is added to the aqueous solution, more finely divided particles of the co-precipitate may be obtained. The molar amount of oxalic acid is preferably 1.3 to 2.5 times as much as the molar amount of the water-soluble nickel compound dissolved in the buffer solution. If the amount of oxalic acid is less than 1.3 times, it is not preferred because a control of pH in the buffer solution is impossible. And then it is difficult to obtain $Li_xNiO_2$ after the calcination. If the amount of oxalic acid is more than 2.5 times, it is not preferred because a lot of impurities are mingled at the same time, although $Li_xNiO_2$ may be obtained. Moreover, the slightly water-soluble lithium salt of the co-precipitate is apt to be soluble in the resulting low pH solution. X-ray diffraction analysis and DTA-TG (Differential Thermal Analysis—thermogravimetry) measurement show that the slightly water-soluble co-precipitate contains the composite oxalate, lithium oxalate and nickel oxalate. The co-precipitate may comprise a composite oxalate of lithium and nickel or a mixture of lithium oxalate, nickel oxalate and composite oxalate of lithium and nickel and shows two thermal decomposition peaks around 300–350° C. in DTA-TG measurement, which are consistent with the fact that there is composite oxalate of lithium and nickel. In DTA-TG measurement, it is confirmed that nickel oxalate shows only one thermal decomposition peaks around 300–350° C. In DTA-TG measurement, two thermal decomposition peaks corresponding to the composite oxalate and nickel oxalate around 300–350° C. and a thermal decomposition peak corresponding to lithium oxalate around 500° C. are observed.

In the process of producing $Li_xN_{1-Y}M_YO_2$, the molar amount of oxalic acid to be added in order to cause the co-precipitation is preferably 1.3 to 2.5 times as much as the molar amount of the water-soluble nickel compound or the compound containing the element M dissolved in the buffer solution. If the molar amount of oxalic acid is less than 1.3 times, it is not preferred because the amount of lithium in the aqueous solution is not sufficient to give $Li_xN_{1-Y}M_YO_2$. If the molar amount of oxalic acid is more than 2.5 times, it is not preferred because a lot of impurities are mingled at the same time, although $Li_xN_{1-Y}M_YO_2$ may be obtained, and also it is not preferred in terms of cost.

In step #20, the co-precipitate can be isolated from the aqueous solution containing the produced co-precipitate e.g., by filtration or decantation. In step #25, the isolated co-precipitate is dried. In step #30, the dried co-precipitate (precursor) is calcined. The calcination may be conducted preferably at the temperature of 650° C. to 900° C., more preferably 700° C. to 850° C. If the calcination is conducted at a temperature below 650° C., $Li_xNiO_2$ crystals grow slowly, so that it is difficult to obtain the $Li_xNiO_2$ having sufficient crystallinity. If the calcination is conducted at a temperature over 900° C., grown crystals of $Li_xNiO_2$ will be decomposed.

The calcination may be preferably carried out in air or in an atmosphere containing 20% or more by volume of oxygen. More preferably, the calcination is carried out in an atmosphere containing 50% or more by volume of oxygen. If the amount of oxygen in the calcining atmosphere is 20% or more by volume, the rest of the gases in the calcining atmosphere may be an inert gas such as argon gas.

It is preferred that the co-precipitate is preliminarily calcined before the calcination. The calcination conducted after the preliminary calcination will be called the main calcination. If the preliminary calcination is conducted, the co-precipitate is dehydrated efficiently, so that the crystal of $Li_xNiO_2$ grows easily. The preliminary calcination is conducted preferably at a temperature of 200° C. to 500° C. If the preliminary calcination is conducted at a temperature below 200° C., it is not preferred because the dehydration is not sufficiently performed. If the preliminary calcination is conducted at a temperature over 500° C., it is not preferred because too much energy is necessary for the preliminary calcination.

It is more preferred that the mixture subjected to the preliminary calcination is cooled or cooled and grinded before the main calcination, and then is subjected to main calcination in air or in an atmosphere containing oxygen in a concentration higher than an atmospheric oxygen concentration, because the surface area of the mixture to be exposed to oxygen in the main calcination step is increased and the reaction is accelerated to produce the sample having nice crystallinity.

As hereunder, an explanation will be given for a non-aqueous secondary battery in which the $Li_xNiO_2$ prepared by the above-mentioned process is used as a positive electrode active material in a positive electrode although constitutions and manufacturing processes of a nonaqueous secondary battery are not limited thereto.

A positive electrode may be prepared using a mixture consisting of the above-mentioned positive electrode active material, a conductive material, a binder and, if necessary, a mixture containing a solid electrolyte, etc. Examples of the specific conductive materials to be used include carbon materials such as carbon black, acetylene black and Ketchen black, powdery graphite materials(e.g., natural graphite and synthetic graphite), powdery metals and fibrous metals, but are not limited thereto. Examples of specific binders include fluoropolymers such as polytetrafluoroethylene and polyvinylidene fluoride, olefin polymers such as polyethylene, polypropylene and ethylene-propylene-diene terpolymer, and styrene-butadiene rubber, but are not limited thereto.

The mixing ratio is preferably 1 part to 50 parts by weight of the conductive material and 1 part to 30 parts by weight of the binder with respect to 100 parts by weight of the positive electrode active material. If the proportion of the conductive material is less than 1 part by weight, the electrical resistance or polarization of the resulting positive electrode is increased to reduce the discharge capacity of the positive electrode, so that a practical secondary battery cannot be fabricated. If the proportion of the conductive material is greater than 50 parts by weight (which may vary depending on the kind of the conductive material to be blended), the amount of the active material contained in the positive electrode is reduced, so that the discharge capacity of the resulting positive electrode is reduced. If the proportion of the binder is less than 1 part by weight, the binding ability is lost. If the proportion of the binder is greater than 30 parts by weight, the discharge capacity of the resulting positive electrode is reduced to an impractical level, because the absolute amount of the positive electrode active material contained in the resulting positive electrode is reduced as in the case of the conductive material and the electrical resistance or polarization of the positive electrode is increased as described above.

A positive electrode can be prepared by molding said mixture. Examples of the molding process include a process wherein the mixture is compressed into pellets and a process wherein a paste prepared by adding an appropriate solvent to the mixture is applied onto a collector, dried and compressed into a sheet form. The positive electrode preparation method is not limited to these methods. The positive electrode may be equipped with a collector playing a role of giving and receiving electrons. The collector is formed of a single metal, an alloy, a carbon material, etc. Examples of specific materials for the collector include titanium, aluminum, stainless steel, etc.; a material prepared by treating the surface of copper, aluminum, stainless steel, etc. with carbon, titanium or silver; and a material prepared by oxidizing the surface of the above-mentioned material. Examples of the shape of the collector include foil, film, sheet, mesh sheet, punched one, lath, porous material, foamed material, molded products of fiber and the like. The thickness of the collector is typically from 1 mm to 1 mm.

In a negative electrode, metal lithium, lithium alloys and/or lithium intercalation and deintercalation substances may be used as a negative electrode active material. Examples of the specific substances include metal lithium, lithium alloy(such as lithium/aluminum alloy, lithium/tin alloy, lithium/lead alloy, Wood's alloy, etc.), substances which can electrochemically be doped or dedoped with lithium ions(such as conductive polymers like polyacetylene, polythiophene, poly-p-phenylene, etc.), pyrolyzed carbon materials, carbon materials pyrolyzed in a gas-phase in the presence of a catalyst, carbon materials obtained by calcining pitch, cokes, tar, etc., carbon materials obtained by calcining polymers such as cellulose, phenol resin, etc., graphite materials (natural graphite, artificial graphite, expanded graphite and the like) which can be intercalated and deintercalated with lithium ions and inorganic compounds (such as $WO_2$ and $MoO_2$) which can be doped or dedoped with lithium ions. These materials may be used either alone or as a composite thereof.

Among these negative electrode active materials, pyrolyzed carbon materials, carbon materials pyrolyzed in a gas phase in the presence of a catalyst, carbon materials obtained by calcining pitch, cokes, tar and the like, carbon materials obtained by calcining polymers and graphite materials (natural graphite, artificial graphite, expanded graphite and the like) are preferable for fabrication of a highly safe secondary battery having superior battery characteristics.

Where the negative electrode is formed by employing any of the aforesaid conductive polymeric materials, carbon materials, graphite materials and inorganic compounds as the negative electrode active material, a conductive material and a binder may be blended therewith. Examples of specific conductive materials to be used include carbon materials such as carbon black, acetylene black and Ketchen black, powdery graphite materials (e.g., natural graphite and artificial graphite), powdery metals and fibrous metals, but are not limited thereto. Examples of specific binders include fluoropolymers such as polytetrafluoroethylene and polyvinylidene fluoride, olefin polymers such as polyethylene, polypropylene and ethylene-propylene-diene terpolymer, and styrene-butadiene rubber, but are not limited thereto.

Exemplary ion conductors to be used for the nonaqueous secondary battery include an organic electrolytic solution, a solid electrolyte (e.g., a polymeric solid electrolyte or an inorganic solid electrolyte) and a molten salt, among which the organic electrolytic solution is preferred.

The organic electrolytic solution usually contains an organic solvent and an electrolyte. Example of specific organic solvents to be used include aprotic organic solvents including esters such as propylene carbonate, ethylene carbonate, butylene carbonate, diethyl carbonate, dimethyl carbonate, methylethyl carbonate, g-butyrolactone, methyl formate and methyl acetate, tetrahydrofuran, substituted tetrahydrofuran such as 2-methyltetrahydrofuran, ethers such as dioxolane, diethyl ether, dimethoxyethane, diethoxyethane and methoxyethoxyethane, dimethylsulfoxide, sulfolane, methylsulfolane and acetonitrile. These organic solvents may be used either alone or in combination.

Examples of specific electrolytes include lithium salts such as lithium perchlorate, lithium borofluoride, lithium phosphorofluoride, lithium hexafluoroarsenate, lithium trifluoromethane sulfonate, lithium halides and lithium chloroaluminate. These electrolytes may be used either alone or in combination. The electrolytic solution is prepared by dissolving the electrolyte in the organic solvent. The organic solvent and the electrolyte to be used for the preparation of the electrolytic solution are not limited to these described above.

Examples of the applicable inorganic solid electrolyte include nitrides, halides, oxoacid salts of lithium. Examples thereof include $Li_3N$, $LiI$, $Li_3N$-$LiI$-$LiOH$, $LiSiO_4$, $LiSiO_4$-$LiI$-$LiOH$, $Li_3PO_4$-$Li_4SiO_4$, phosphorus sulfide compounds and $Li_2SiS_3$.

Usable as the organic solid electrolyte are a substance comprised of a polymer permitting the dissociation of the electrolyte and a substance comprised of a polymer having an ionization group. Examples of the polymer permitting the dissociation of the electrolyte include polyethylene oxide, derivatives of polyethylene oxide, polypropylene oxide, derivatives of polypropylene oxide, polymers containing at least such derivatives, phosphate polymers, etc.

Besides these, there is a process wherein a mixture of a polymer matrix material containing the above-mentioned aprotic polar solvent, a polymer containing an ionization group and the above-mentioned aprotic electrolyte and polyacrylonitrile are added to the electrolytic solution. Another process wherein an inorganic solid electrolyte and an organic solid electrolyte are jointly used is known as well.

A separator is used to retain the electrolytic solution. Exemplary materials for the separator include woven fabric and nonwoven fabric of electrically insulated synthetic resin fibers, glass fibers, natural fibers, etc., microporous materials, molded products of alumina powder and the like. Among them, nonwoven fabric of polyethylene, polypropylene and like synthetic resins and microporous materials are particularly preferred in terms of quality stability.

A separator made of a nonwoven fabric of any of such synthetic resin fibers or a microporous material may be adapted to isolate the positive electrode and the negative electrode from each other when the battery is abnormally heated to cause the separator to be fused. From a viewpoint of safety, the separator of this type is preferably used. The thickness of the separator is not particularly limited as long as the separator can retain a required amount of the electrolyte solution and prevent the short circuit between the positive electrode and the negative electrode, but may be typically about 0.01 mm to about 1 mm, preferably about 0.02 mm to about 0.05 mm.

The battery may be in a shape of coin, button, sheet, cylinder, square, etc. In the case of batteries in a shape of coin or button, the positive electrode and the negative electrode are usually formed into pellets. In the case of batteries in a shape of cylinder and square, the positive electrode and the negative electrode are usually formed into sheets and put in a battery can. The electrodes are electrically connected to the can.

After that, the electrolyte solution is poured in the can, and the can is sealed with the sealing plate with an insulated packing interposed therebetween or with the sealing plate insulated from the can by a hermetic sealing. At that time, a safety valve including a safety device may be used for the sealing plate. Exemplary safety devices include a fuse, a bimetal and a PTC device which function as an overcurrent preventive device. The hermetic sealing (gasket), the sealing plate or the battery can may be formed with a slit for prevention of an increase in the inner pressure of the battery can. Further, an external circuit for preventing over-charging or over-discharging of the battery may be used.

The pellet type or sheet type electrodes are preferably dried and dehydrated in advance in a usual manner. For example, hot air, vacuum, infrared radiation, far-infrared radiation, electron beam and low moisture air may be used alone or in combination for the drying and dehydration of the electrodes. The temperature for the drying and dehydration is preferably within a range between 50° C. and 380° C.

$Li_xNiO_2$ and $Li_xN_{1-y}M_yO_2$ according to the present invention is used as a positive electrode active material, therefore it is possible to provide the nonaqueous secondary battery having a discharge capacity of not less than 149 mAh/g in the first charging/discharging cycle of charging/discharging.

EXAMPLES

In order to describe the present invention in detail, Examples according to the present invention will follow below, but are not limited thereto.

Example 1

Preparation of Positive Electrode Active Material $Li_xNiO_2$ 0.30 mole of lithium acetate and 0.30 mole of acetic acid were dissolved in 100 ml of water to make a buffer solution, to which 0.030 mole of anhydrous lithium hydroxide and 0.030 mole of nickel nitrate hexahydrate were dissolved and stirred. To this solution, 0.045 mole of oxalic acid powder was added to liberate a co-precipitate. Then, the resulting suspension was stirred for 2 hours at room temperature and filtered to isolate the co-precipitate. The dried co-precipitate (precursor) was calcined at 700° C. for 10 hours in an oxygen atmosphere and grinded to obtain $Li_xNiO_2$ as a positive electrode active material.

Preparation and Evaluation of Electrode

A positive electrode was prepared using the $Li_xNiO_2$ thus obtained as the positive electrode active material. $Li_xNiO_2$, acetylene black as a conductive material and polytetrafluoroethylene as a binder were mixed in a mortar in the ratio by weight of 100:10:10. A titanium mesh was embedded into this mixture, which was then press-molded into a pellet having a diameter of 20 mm and a weight of 0.10 g. A titanium wire for a current collection line was spot-welded to the titanium mesh which had been added at the time of press-molding. Thus, the electrode was prepared for evaluation thereof.

The electrode was evaluated by the three electrode method in which lithium electrodes were used as a counter electrode and a reference electrode. Used as the electrolytic solution was a solution in which 1 M lithium perchlorate ($LiClO_4$) was dissolved in a mixture containing ethylene carbonate and ethylmethyl carbonate in a volume ratio of 1:1.

In the first charging and discharging cycle, the electrode was charged at a current density of 27.4 mA/g up to 4.2 V relative to the lithium reference electrode, and then discharged to 2.7 V at the same current density. The charging and discharging process was thereafter repeated within the same potential range and at the same current density. As a result, the discharge capacity per 1 g of the active material in the first charging/discharging cycle for this electrode was 158 mAh/g.

Example 2
Preparation of Positive Electrode Active Material $Li_xNiO_2$ 0.20 mole of lithium lactate and 0.20 mole of lactic acid were dissolved in 100 ml of water to make a buffer solution, to which 0.020 mole of anhydrous lithium hydroxide and 0.015 mole of nickel chloride hexahydrate were dissolved and stirred. To this solution, 0.030 mole of oxalic acid powder was added to liberate a co-precipitate. Then, the resulting suspension was stirred for 2 hours at room temperature, and filtered to isolate the co-precipitate. The dried co-precipitate(precursor) was calcined at 800° C. for 2 hours in an oxygen atmosphere and grinded to obtain $Li_xNiO_2$ as a positive electrode active material.

Preparation and Evaluation of Electrode

A positive electrode was prepared using the $Li_xNiO_2$ obtained according to Example 2 as a positive electrode active material. The same operations as in the preparation of the positive electrode as mentioned in Example 1 were applied including the process of manufacture of the electrode and weight and size of the pellets except that $Li_xNiO_2$, acetylene black as a conductor and polytetrafluoroethylene as a binder were mixed in a ratio by weight of 100:20:10.

The performance of the positive electrode was evaluated in substantially the same manner as in Example 1 where $Li_xNiO_2$ was used, except that an electrolytic solution was prepared with 1M lithium phosphofluoride dissolved in a mixture containing propylene carbonate and dimethyl carbonate in a volume ratio of 1:1. As a result, the discharge capacity in the first charging/discharging cycle for this electrode was 149 mAh/g.

Example 3
Preparation of Positive Electrode Active Material $Li_xNiO_2$ 0.20 mole of lithium acetate and 0.20 mole of tartaric acid were dissolved in 100 ml of water to make a buffer solution, to which 0.020 mole of lithium nitrate trihydrate and 0.015 mole of nickel chloride hexahydrate were dissolved and stirred. To this solution, 0.030 mole of oxalic acid powder was added to liberate a co-precipitate. Then, the resulting suspension was stirred for 2 hours at room temperature, and filtered to isolate the co-precipitate. The dried co-precipitate (precursor) was calcined at 800° C. for 2 hours in an oxygen atmosphere and grinded to obtain $Li_xNiO_2$ as a positive electrode active material.

Preparation and Evaluation of Electrode

A positive electrode was prepared using the $Li_xNiO_2$ obtained according to Example 3 as the positive electrode active material. The same operations as in the preparation of the positive electrode as mentioned in Example 1 were applied including the process of manufacture of the electrode and weight and size of the pellets except that $Li_xNiO_2$, acetylene black as a conductor and polytetrafluoroethylene as a binder were mixed in a ratio by weight of 100:5:7.

The performance of the positive electrode was evaluated in substantially the same manner as in Example 1 where $Li_xNiO_2$ was used, except that an electrolytic solution was prepared with 1M lithium perchlorate dissolved in a mixture containing ethylene carbonate and diethyl carbonate in a volume ratio of 1:1. As a result, the discharge capacity in the first charging/discharging cycle for this electrode was 155 mAh/g.

The above-mentioned Examples 1 to 3 describe the processes of manufacturing $Li_xNiO_2$ obtained by co-precipitation in the buffer according to the present invention. For comparison with Examples 1 to 3, four examples of the conventional processes of producing $Li_xNiO_2$ would be given as hereinafter.

Comparative Example 1
Preparation of Positive Electrode Active Material $Li_xNiO_2$ This Comparative Example 1 is a process of mixing a solid lithium compound and a solid nickel compound. Lithium hydroxide and nickel oxyhydroxide were weighed so as to make a molar ratio of lithium in lithium hydroxide to nickel in nickel oxyhydroxide 1.1:1. They were mixed in a mortar and a pressure of 100 kg/cm² was applied to the mixture to prepare pellets. The pellets were calcined at 800° C. for 2 hours in an oxygen atmosphere followed by pulverizing to give $Li_xNiO_2$ as a positive electrode active material.

Comparative Example 2
Preparation of Positive Electrode Active Material $Li_xNiO_2$ This Comparative Example 2 is a process of mixing an aqueous solution of a lithium compound and an aqueous solution of a nickel compound. Lithium hydroxide and nickel chloride were weighed so as to make a molar ratio of lithium in lithium hydroxide to nickel in nickel chloride 1:1. Each of lithium hydroxide and nickel chloride was dissolved in water to prepare an aqueous solution, respectively.

The aqueous solution of lithium hydroxide was gradually added to the aqueous solution of nickel chloride with stirring and the mixture was stirred at 30° C. for 5 hours. This was dried at 90° C. to 100° C. and the dried solid was pulverized. A pressure of 100 kg/cm² was applied thereto to prepare pellets. The pellets were calcined at 800° C. for 2 hours in an oxygen atmosphere to give $Li_xNiO_2$ as a positive electrode active material.

Comparative Example 3
Preparation of Positive Electrode Active Material $Li_xNiO_2$ This Comparative Example 3 is a process wherein water was added as a dispersion medium to a solid lithium compound and a solid nickel compound. Lithium hydroxide and nickel hydroxide were weighed so as to make a molar ratio of lithium in lithium hydroxide to nickel in nickel hydroxide 1:1. A small amount of water was added to the lithium hydroxide and nickel hydroxide and they were mixed in a mortar. This mixture was dried at 90° C. to 100° C. and the dried solid was pulverized. A pressure of 100 kg/cm² was applied thereto to prepare pellets and the resulting pellets were calcined at 800° C. for 2 hours in an oxygen atmosphere to give $Li_xNiO_2$ as a positive electrode active material.

Comparative Example 4
Preparation of Positive Electrode Active Material $Li_xNiO_2$ This Comparative Example 4 is a process of adding an aqueous solution of lithium compound to a solid nickel compound. Lithium chloride and nickel oxide were weighed so as to make a molar ratio of lithium in lithium chloride to nickel in nickel oxide 1:1. Lithium chloride was dissolved in water to prepare an aqueous solution. The aqueous solution of lithium chloride was gradually added to nickel oxide with kneading followed by stirring/kneading at 30° C. for 5 hours. This mixture was dried at 90° C. to 100° C. and the dried solid was pulverized and a pressure of 100 kg/cm² was applied thereto to prepare pellets. The pellets were calcined at 800° C. for 2 hours in an oxygen atmosphere to give $Li_xNiO_2$ as a positive electrode active material.

Preparation and Evaluation of Electrodes

A positive electrode was manufactured using the $Li_xNiO_2$, prepared according to Comparative Examples 1 to 4, as a positive electrode active material and its performance was evaluated, respectively. The same operations as in the preparation and evaluation of the positive electrode as mentioned in Example 1 were applied including the process of preparation and evaluation of the electrodes. The discharge capacity in the first charging/discharging cycle for the electrodes using $Li_xNiO_2$ prepared according to Comparative Examples 1 to 4 in this order recited 124 mAh/g, 120 mAh/g, 110 mAh/g and 127 m mAh/g, respectively.

The discharge capacity in the first charging/discharging cycle for the electrodes using $Li_xNiO_2$ according to Examples 1 to 3 in this order recited 158 mAh/g, 149 mAh/g and 155 mAh/g, respectively. When the discharge capacities in Examples 1 to 3 were compared with those in Comparative Examples 1 to 4, it was noted that the value of the discharge capacity according to the present invention was higher. Namely, it was noted that the discharge capacities in the first charging/discharging cycle for the electrodes was improved when $Li_xNiO_2$ was used as a positive electrode active material in accordance with the present invention.

Also, Example 1 was repeated three times, a positive electrode was manufactured using the $Li_xNiO_2$ as a positive electrode active material and each performance was evaluated, respectively. The same operation as in the preparation and evaluation of the positive electrode as mentioned in Example 1 was applied including the process of preparation and evaluation of the electrodes.

As a result, the discharge capacities in the first charging/discharging cycle for the electrodes using the above-mentioned $Li_xNiO_2$ recited 156 mAh/g, 161 mAh/g and 157 mAh/g. On the other hand, the discharge capacity of $Li_xNiO_2$ according to Example 1, prepared to compare Examples with Comparative Examples, was 158 mAh/g, as mentioned above.

Comparative Example 5

Preparation of Positive Electrode Active Material $Li_xNiO_2$

Comparative Example 5 is a process wherein no buffer solutions are used to produce $Li_xNiO_2$. 0.030 mole of anhydrous lithium hydroxide and 0.030 mole of nickel nitrate hexahydrate were dissolved in water, to which 0.045 mole of oxalic acid powder was added to liberate a co-precipitate. Then, the resulting suspension was stirred for 2 hours at room temperature. This solution containing the co-precipitate was filtered and an obtained co-precipitate was dried. The dried co-precipitate (precursor) was calcined in an oxygen atmosphere at 700° C. for 10 hours and grinded to obtain $Li_xNiO_2$ as a positive electrode active material.

Preparation and Evaluation of Electrodes

Comparative Example 5 was repeated four times, a positive electrode was manufactured using the $Li_xNiO_2$ as a positive electrode active material and each performance was evaluated, respectively. The same operations as in the preparation and evaluation of the positive electrode as mentioned in Example 1 were applied including the process of preparation and evaluation of the electrodes. The discharge capacities in the first charging/discharging cycle for the electrodes using the above-mentioned $Li_xNiO_2$ recited 130 mAh/g, 148 mAh/g, 85 mAh/g and 124 mAh/g.

The discharge capacity of four examples according to Example 1 were compared with the discharge capacity of four examples according to Comparative Example 5. All values of the discharge capacity according to Example 1 (158 mAh/g, 156 mAh/g, 161 mAh/g, 157 mAh/g) were very close to each other. However, values of the discharge capacity according to Comparative Example 5 (130 mAh/g, 148 mAh/g, 85 mAh/g, 124 mAh/g), where no buffer solutions were used in a process, were widespread. Accordingly, co-precipitation in the buffer solution according to the process of the present invention always afforded $Li_xNiO_2$ with a high and constant quality. Also each molar amount of lithium and nickel in the mixture of the lithium salt and the nickel salt (co-precipitate) may be controlled without difficulties.

As is apparent from the comparison between Examples 1 to 3 and Comparative Examples 1 to 5, it was noted that the discharge capacity in the first charging/discharging cycle using the $Li_xNiO_2$ prepared by the process of the present invention was improved, variability of $Li_xNiO_2$ samples according to the present invention was decreased and the molar ratio of lithium to nickel (lithium/nickel) in the co-precipitate according to the present invention is controlled easily.

Example to investigate a relationship between a molar ratio of an organic or its lithium salt to water-soluble nickel compound dissolved in a buffer solution, and a discharge capacity in the first charging/discharging cycle Preparation of Positive Electrode Active Material $Li_xNiO_2$ $Li_xNiO_2$ was obtained by a process as mentioned below. Lithium acetate and acetic acid in a molar ratio of 1:1 were dissolved in water to make a buffer solution, to which 0.030 mole of anhydrous lithium nitrate and 0.030 mole of nickel nitrate hexahydrate were dissolved and stirred. To this buffer, 0.045 mole of oxalic acid powder was added to liberate a co-precipitate. Then, the resulting suspension was stirred for 2 hours at room temperature, and filtered to isolate the co-precipitate. The isolated co-precipitate(precursor) was dried. The dried co-precipitate was calcined at 750° C. for 8 hours in an oxygen atmosphere and grinded to obtain $Li_xNiO_2$ as a positive electrode active material.

Here, the buffer solutions with various concentrations of the organic acid and the lithium salt were prepared and used to produce various $Li_xNiO_2$s for investigating the relationship between a molar ratio of the organic acid or its lithium salt of the organic acid to the water-soluble nickel compound dissolved in the buffer solution, and the discharge capacity in the first charging/discharging cycle of the electrode using obtained $Li_xNiO_2$. Each of 0.05 mole(aforesaid ratio=1.66), 0.10 mole(aforesaid ratio=3.33), 0.20 mole(aforesaid ratio=6.66), 0.30 mole(aforesaid ratio=10), 0.50 mole(aforesaid ratio=16.66) and 1.00 mole(aforesaid ratio=33.33) of lithium acetate and acetic acid respectively was dissolved in water to make various buffer solutions. $Li_xNiO_2$ was produced using the buffer solution thus prepared, respectively.

Preparation and Evaluation of Electrodes

A positive electrode was prepared using the $Li_xNiO_2$ thus obtained from the various buffer solution as a positive electrode active material. The same operation as in the preparation of the positive electrode as mentioned in Example 1 was applied including the process of manufacture of the electrode and weight and size of the pellets except that $Li_xNiO_2$, acetylene black as a conductor and polytetrafluoroethylene as a binder were mixed in a ratio by weight of 100:15:8.

The performance of the positive electrode was evaluated in substantially the same manner as in Example 1 where $Li_xNiO_2$ was used, except that an electrolytic solution was prepared with 1M lithium phosphofluoride dissolved in a mixture containing propylene carbonate and diethyl carbonate in a volume ratio of 1:1.

Figure 2:
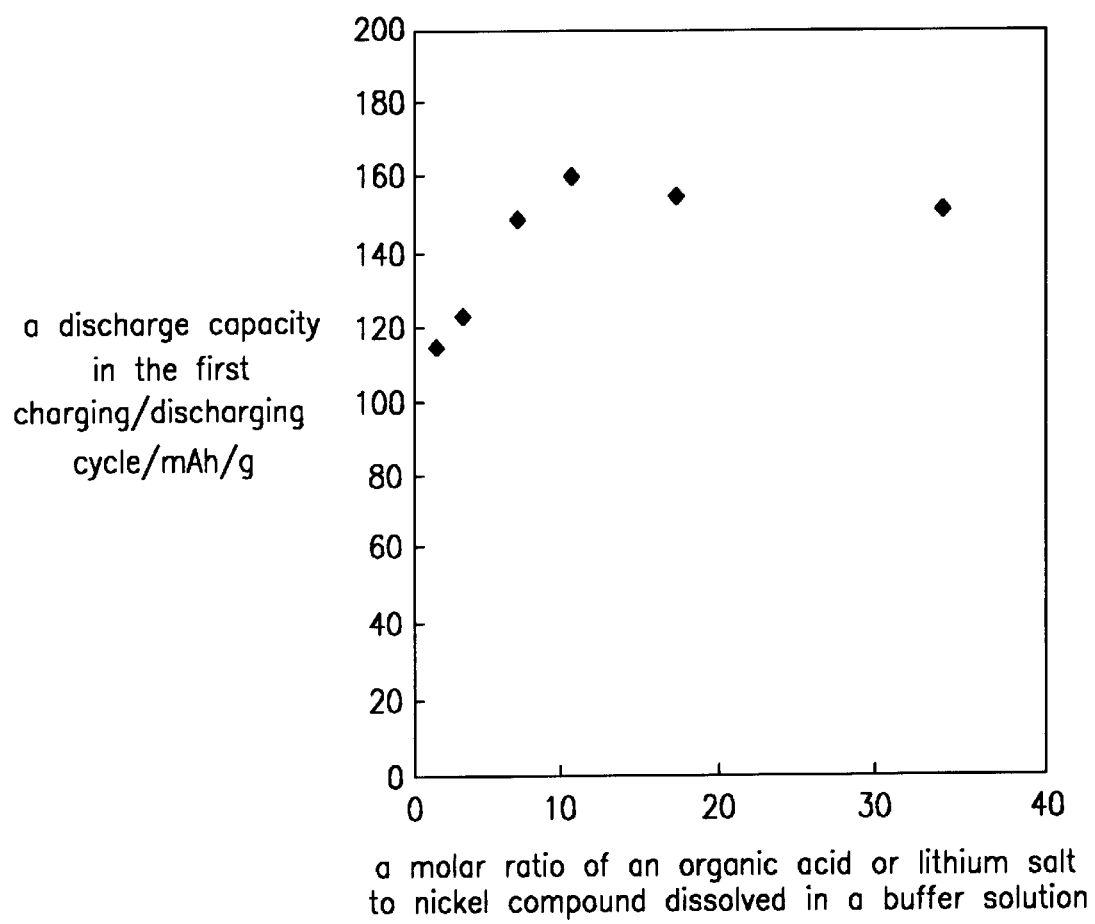
FIG. 2 shows a relationship between a molar ratio of an organic acid or its lithium salt to a water-soluble nickel compound dissolved in a buffer solution, and a discharge capacity of a battery in the first charging/discharging cycle using the positive electrode active material.

FIG. 2 is a graphical representation illustrating the relationship between a molar ratio of the organic acid or its lithium salt to the water-soluble nickel compound dissolved in the buffer solution, and a discharge capacity in the first charging/discharging cycle in accordance with the present invention. A higher value of the discharge capacity was obtained when a molar amount of the organic acid or its lithium salt dissolved in the buffer solution was more than 3 times as much as the molar amount of the water-soluble nickel compound compared with the case when the molar amount of the organic acid or its lithium salt dissolved in the buffer solution was less than 3 times.

Accordingly, it was noted that, if $Li_xNiO_2$ according to the present invention process, wherein the molar amount of the organic acid or lithium salt of the organic acid dissolved in the buffer solution was more than 3 times as much as the molar amount of the water-soluble nickel compound, was used as the positive electrode active material, the electrode having high discharge capacity in the first charging/discharging cycle was obtained.

Example to investigate the relationship between a calcining temperature and a discharge capacity in the first charging/discharging cycle Preparation of Positive Electrode Active Material $Li_xNiO_2$ $Li_xNiO_2$ was obtained by a process as mentioned below. 0.25 mole of lithium acetate and 0.25 mole of acetic acid were dissolved in water to make a buffer solution, to which 0.030 mole of lithium hydroxide and 0.020 mole of nickel chloride hexahydrate were dissolved and stirred. To this solution, an aqueous solution of 0.050 mole of oxalic acid was added to liberate a co-precipitate. Then, the resulting suspension was stirred for 2 hours at room temperature. This solution containing the co-precipitate was filtered and the obtained co-precipitate was dried. The dried co-precipitate (precursor) was calcined in an oxygen atmosphere for 5 hours and grinded to obtain $Li_xNiO_2$ as a positive electrode active material.

The co-precipitate was subjected to the calcination at various temperatures of 600° C., 650° C., 700° C., 750° C., 800° C., 850° C., 900° C., 940° C. and 980° C. for investigating the relationship between a calcinating temperature and a discharge capacity in the first charging/discharging cycle.

Preparation and Evaluation of Electrodes

A positive electrode was prepared using the $Li_xNiO_2$ thus obtained as a positive electrode active material. The same operation as in the preparation of the positive electrode as mentioned in Example 1 was applied including the process of manufacture of the electrode and weight and size of the pellets except that $Li_xNiO_2$, acetylene black as a conductor and polytetrafluoroethylene as a binder were mixed in a ratio by weight of 100:8:10.

The performance of the positive electrode was evaluated in substantially the same manner as in Example 1 where $Li_xNiO_2$ was used, except that an electrolytic solution was prepared with 1M lithium perchlorate dissolved in a mixture containing ethylene carbonate and diethyl carbonate in a volume ratio of 1:1.

Figure 3:
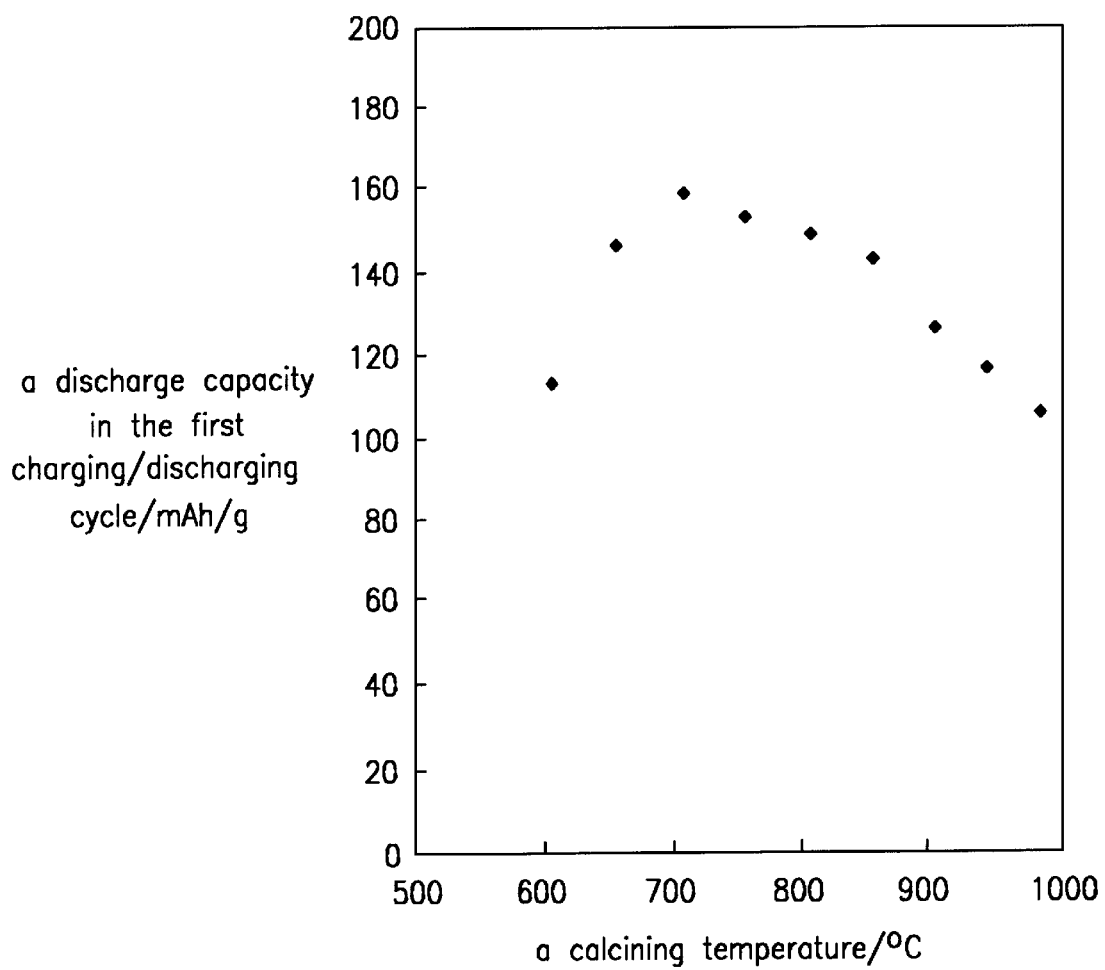
FIG. 3 shows a relationship between a calcining temperature and a discharge capacity in the first charging/discharging cycle using the positive electrode active material.

FIG. 3 is a graphical representation illustrating the relationship between a calcining temperature and a discharge capacity in the first charging/discharging cycle of electrode using $Li_xNiO_2$ calcined at the corresponding temperature. When the calcining temperature was in the range between 650° C. to 900° C., especially 700° C. to 850° C., high value of discharge capacity was obtained. Accordingly, it has been noted that if $Li_xNiO_2$ according to the present invention process wherein the calcining temperature was in the range between 650° C. to 900° C. was used as a positive electrode active material, a electrode having high discharge capacity in the first charging/discharging cycle was obtained.

Example to investigate the relationship between a volume ratio of an oxygen concentration in a calcining atmosphere and a discharge capacity in the first charging/discharging cycle Preparation of Positive Electrode Active Material $Li_xNiO_2$ $Li_xNiO_2$ was obtained by a process as mentioned below. 0.30 mole of lithium acetate and 0.30 mole of acetic acid were dissolved in water to make a buffer solution, to which 0.025 mole of lithium bromide and 0.020 mole of nickel bromide hexahydrate were dissolved and stirred. To this solution, 0.035 mole of oxalic acid powder was added to liberate a co-precipitate. Then, the resulting suspension was stirred for 2 hours at room temperature and filtered to isolate the co-precipitate. The isolated co-precipitate (precursor) was dried. The dried co-precipitate was calcined at 700° C. for 8 hours and grinded to obtain $Li_xNiO_2$ as a positive electrode active material.

In the above calcination, various atmospheres containing different concentrations of oxygen, i.e. 10%, 20% (air), 30%, 50%, 70%, 80% and 100%, were used for investigating the relationship between a volume ratio of an oxygen concentration in a calcining atmosphere and a discharge capacity in the first charging/discharging cycle.

Preparation and Evaluation of Electrodes

A positive electrode was prepared using the $Li_xNiO_2$ thus obtained as a positive electrode active material. The same operation as in the preparation of the positive electrode as mentioned in Example 1 was applied including the process of manufacture of the electrode and weight and size of the pellets except that $Li_xNiO_2$, acetylene black as a conductor and polytetrafluoroethylene as a binder were mixed in a ratio by weight of 100:15:8.

The performance of the positive electrode was evaluated in substantially the same manner as in Example 1 where $Li_xNiO_2$ was used, except that an electrolytic solution was prepared with 1M lithium phosphofluoride dissolved in a mixture containing propylene carbonate and dimethyl carbonate in a volume ratio of 1:1.

Figure 4:
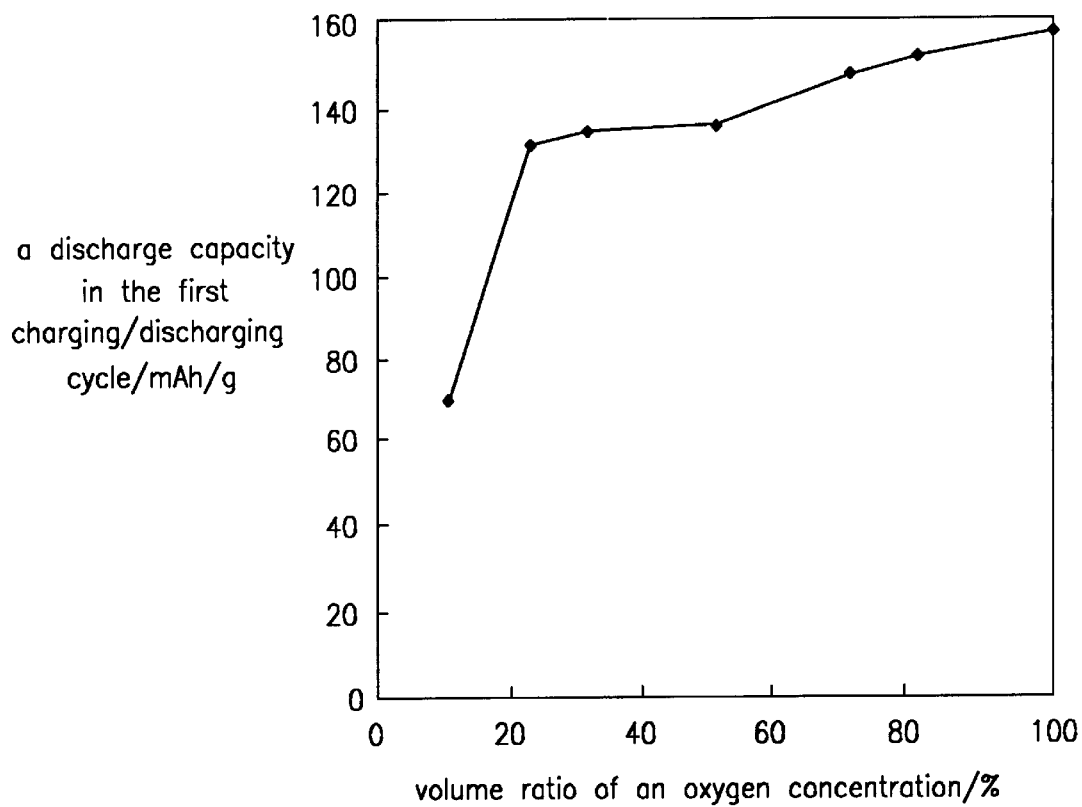
FIG. 4 shows a relationship between a volume ratio of an oxygen concentration in a calcining atmosphere and a discharge capacity in the first charging/discharging cycle using the positive electrode active material.

FIG. 4 is a graphical representation illustrating the relationship between a volume ratio of an oxygen concentration in a calcining atmosphere and a discharge capacity in the first charging/discharging cycle. When the calcination was conducted in an atmosphere containing 20% or more by volume of oxygen, especially 50% or more, high value of discharge capacity was obtained. Namely, it was noted that if $Li_xNiO_2$ according to the present invention process wherein the calcination was conducted in the atmosphere containing 20% or more by volume of oxygen was used as the positive electrode active material, the electrode having high discharge capacity in the first charging/discharging cycle was obtained.

A charging/discharging test of the battery manufactured using the $Li_xNiO_2$ prepared in Example 1 as a positive electrode active material was conducted. The same operation as in the preparation of the $Li_xNiO_2$ and the positive electrode as mentioned in Example 1 was applied except that the size of the pellets was 15 mm in diameter and the weight of the pellets was 50 mg.

A pyrolyzed carbon material was used as a negative electrode. More specially, a starting material of propane was pyrolyzed at 750° C. in a gas phase under atmospheric pressure, and the resulting pyrolyzed carbon was deposited on a nickel substrate(surface area: 4 cm$^2$) for 2 hours. The X-ray diffraction analysis showed that the interplanar distance d(002) of plane (002) of the pyrolyzed carbon material was 0.337 nm and the thickness (Lc) of the crystal layer in the direction of plane (002) was 15 nm.

The argon laser Raman spectrum analysis showed that the ratio of a peak intensity at around 1360 cm$^{-1}$ to that at around 1580cm$^{-1}$(R value) was 0.45. A nickel wire was spot-welded on the pyrolyzed carbon of the negative electrode to establish a current collection line. The negative electrode was dried at 200° C. under reduced pressure for removing moisture therefrom. The negative electrode contained 35 mg of the negative electrode active material.

A battery of beaker type cell was fabricated by using the positive and negative electrodes prepared in the aforesaid manner and a charging/discharging test of the battery was conducted. Used as an electrolytic solution was a solution in which 1M lithium perchlorate was dissolved in a solvent mixture containing propylene carbonate and diethyl carbonate in a ratio by volume of 1:1.

The battery thus fabricated was evaluated through a charging/discharging test in which the battery was charged up to 4.4 V at a current of 0.2 mA, and discharged to 2.5 V at the same current in the first charging and discharging cycle. The charging and discharging process was thereafter repeated within the same voltage range at the same current for evaluation of the battery. As a result, the discharge capacity of the battery was 7.8 mAh in the first charging/discharging cycle and 7.2 mAh in the 100th cycle.

A charging/discharging test of the battery of a coin type in accordance with the present invention was conducted. First, a positive electrode was manufactured. The same operation as in the preparation of the Li$_x$NiO$_2$ and the positive electrode as mentioned in Example 1 was applied except that the size of the pellets was 15 mm in diameter, the thickness of these was 0.75 mm and the weight of these was 0.20 g.

A negative electrode was prepared as follows. Natural graphite from Madagascar (flakes; particle size: 11 mm; interplanar distance d(002) of plane (002): 0.337 nm; thickness (Lc) of the crystal layer in the direction of plane (002): 27 nm; extent (La) of crystal layer in the direction of plane (002): 17 nm; intensity ratio (R) of the peak observed around 1360 cm$^{-1}$ to that observed around 1580 cm$^{-1}$ of wave numbers of scattering spectrum by an argon laser Raman analysis: 0; specific surface area: 8 m$^2$/g) was used as an active material for the negative electrode.

Natural graphite and polytetrafluoroethylene acting as a binder were mixed in a ratio by weight of 10:1. To this mixture was added a nickel mesh as a collector and molded with pressure to prepare pellets of 15 mm diameter, 0.59 mm thickness and 0.10 g weight as a negative electrode active material. The pellets were dried in vacuo at 200° C. to remove moisture therefrom.

Figure 5:
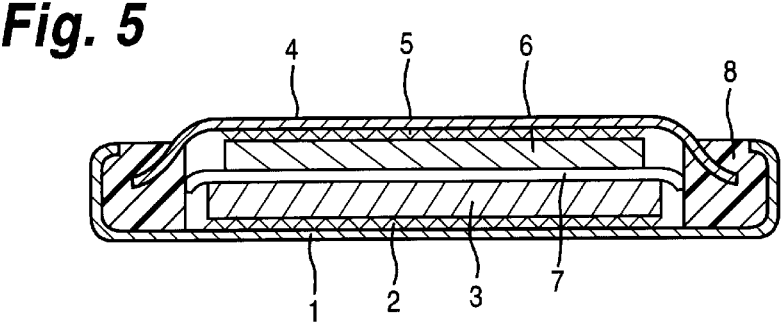
FIG. 5 shows a cross sectional view of a coin-type battery using the positive electrode active material in accordance with the present invention.

A battery of a coin type was fabricated using the positive and negative electrodes which were prepared as follows. FIG. 5 shows a cross sectional view of the battery of a coin type in accordance with the present invention. In the inner part of a positive electrode can 1 of low cylindrical shape, an insulating packing 8 was installed along the inside wall. A positive electrode 3 integrally formed with a positive electrode collector 2 was bonded with pressure to the inside of this insulating packing 8.

At this time, the positive electrode collector 2 was adjacent to the bottom of the positive electrode can 1. On this positive electrode 3, a separator 7 made of nonwoven polypropylene fabric and a negative electrode 6 which was integrally formed with a negative electrode collector 5 were placed adjacently in this order from bottom to top. The separator 7 was impregnated with an electrolyte solution where lithium phosphofluoride was dissolved in a concentration of 1M in a solvent which was a 2:1:3(by volume) mixture of ethylene carbonate: propylene carbonate: diethyl carbonate.

A negative electrode can 4 was placed over the negative electrode 6 and this negative electrode can 4 and the positive electrode can 1 were tightly sealed by means of caulking via an insulation packing 8. As a result, the negative electrode 6 was bonded tightly to the negative electrode can 4 and, especially, the negative electrode collector 5 was in contact with the inner surface of the negative electrode can 4.

The charging/discharging test of this battery of a coin type was conducted as follows. A charging/discharging current was 1 mA and a constant-current discharge was conducted until the upper-limit charging voltage of 4.4 V and then a constant-current discharge was conducted until 2.5 V of the lower-limit discharging voltage. In the second run and thereafter, charging/discharging was conducted within a range of the same current and voltage. As a result, the discharge capacity of the battery was 28.0 mAh in the first charging/discharging cycle and 25.7 mAh in the 100th cycle.

A charging/discharging test of the cylindrical battery in accordance with the present invention was conducted. A positive electrode in a form of sheet was prepared. The same operation as in the preparation of the Li$_x$NiO$_2$ as mentioned in Example 1 was applied. A process of manufacturing an electrode using the above Li$_x$NiO$_2$ as a positive electrode active material was as follows. Li$_x$NiO$_2$, acetylene black as a conductor and polyvinylidene fluoride as a binder were mixed in a ratio by weight of 100:7:10.

This was further mixed with N-methyl-2-pyrrolidone as a dispersing agent to prepare a paste for a positive electrode. The paste for positive electrode was applied onto both sides of aluminum foil (thickness: 20 mm) acting as a collector, dried and rolled followed by cutting into strips. Weight of the active material per unit area of the positive electrode was 40 mg/cm$^2$. An aluminum tab acting as a positive electrode lead was attached to one end of the positive electrode by means of spot welding.

Artificial graphite (particle size: 8 mm; interplanar distance d(002) of plane (002): 0.337 nm; thickness (Lc) of the crystal layer in the direction of plane (002): 25 nm; extent (La) of crystal layer in the direction of plane (002): 13 nm; intensity ratio (R) of the peak observed around 1360 cm$^{-1}$ to that observed around 1580 cm$^{-1}$ of wave numbers of scattering spectrum by an argon laser Raman analysis: 0; specific surface area: 12 m$^2$/g) was used as a negative electrode active material. The artificial graphite and polyvinylidene fluoride acting as a binder were mixed in a ratio by weight of 100:10.

To this mixture was added N-methyl-2-pyrrolidone as a dispersing agent followed by mixing to prepare a paste for a negative electrode. The paste for a negative electrode was applied onto both sides of a copper foil (thickness: 18 mm) acting as a collector, dried and cut into strips. Weight of the active material of the negative electrode per unit area was 20 mg/cm$^2$. A nickel tab acting as a negative electrode lead was attached to one end of the negative electrode by means of spot welding.

Figure 6:
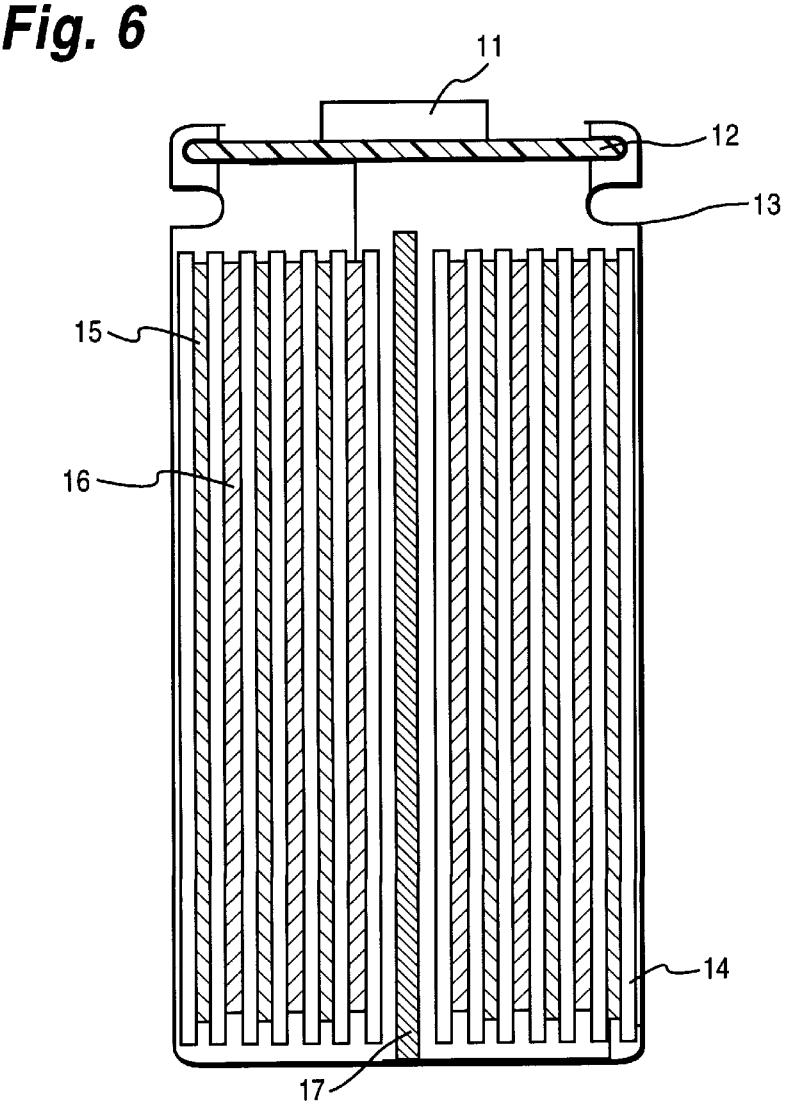
FIG. 6 shows a cross sectional view of a cylindrical battery using the positive electrode active material in accordance with the present invention.

Constitution of a cylindrical battery using these electrodes was as follows. FIG. 6 shows a cross sectional view of the cylindrical battery of the present invention. A microporous separator 14 which was made of polyethylene was interposed between each pair of positive electrode 16 and negative electrode 15. These were integrally wound in a spiral form from an end to prepare a cylindrical winding element.

The cylindrical winding element was placed in a cylindrical battery can (diameter: 17 mm; height: 50 mm; made of stainless steel) in such a state that a positive electrode lead was pulled out from the upper side while a negative electrode lead was pulled out from the lower side. The positive and negative electrode leads were attached to the positive electrode cover equipped with a safety valve and to the bottom of the battery can, respectively, by means of spot welding. In order to retain the wound shape, a center pin 17 (diameter: 3.4 mm; length: 40 mm; in a shape of a tube made of stainless steel) was inserted in the center of the winding element.

An electrolyte solution prepared by dissolving lithium phosphofluoride in an amount of 1M in a mixed solvent of ethylene carbonate and diethyl carbonate in a ratio of 1:1 by volume was placed in a battery can. An insulation packing 12 was placed between a positive electrode cover 11 and a battery can 13 and they were tightly sealed by means of caulking.

A charging/discharging test of this cylindrical battery was conducted as follows. In a thermostat vessel of 25° C., charging operation was conducted by means of a constant current and constant voltage for 3 hours at the current of 500 mA and an upper limit voltage of 4.2 V and then a constant current discharging operation was conducted at 100 mA where the lower-limit voltage was 2.75 V. The second run and thereafter were conducted in the same manner. The result was that the discharge capacity in the first charging/discharging cycle was 911 mAh and the discharge capacity at the 50th cycle was 817 mAh.

As mentioned hereinabove in examples of three batteries according to the present invention, it was noted that the discharge capacities of the battery in the first charging/discharging cycle, in the 50th cycle and in the 100th cycle were almost the same. Accordingly, the electrodes of a secondary battery were deteriorated only slightly upon repeated charging/discharging operations and a secondary battery having a long life was achieved.

Examples 4 to 8 and Comparative Examples 6 to 8
Preparation of Positive Electrode Active Material $Li_xNiO_2$ 0.30 mole of lithium acetate and 0.30 mole of acetic acid were respectively dissolved in 100 ml of water and mixed to make a buffer solution in a molar ratio of 1:1. 0.030 mole of lithium hydroxide monohydrate and 0.030 mole of nickel sulfate hexahydrate were dissolved in the buffer solution with stirring. To this buffer solution, 0.045 mole of oxalic acid powder was added to liberate a co-precipitate. Then, the resulting suspension was stirred for 2 hours at room temperature, and filtered to obtained the co-precipitate. The isolated co-precipitate was dried. The dried co-precipitate (precursor) was subjected to preliminarily calcination in air for 10 hours at each of different temperatures of 100° C., 150° C., 200° C., 250° C., 300° C., 400° C., 500° C. and 600° C. Each of the preliminarily calcinated products was calcined for 10 hours at 700° C. in an oxygen atmosphere, followed by grinding to obtain $Li_xNiO_2$ as a positive electrode active material. The above-mentioned preliminarily calcining temperatures correspond in this order to Comparative Examples 6 and 7, Examples 4 to 8 and Comparative Example 8, respectively.

Preparation and Evaluation of Electrodes

A positive electrode was prepared in substantially the same manner as in Example 1. The electrode thus prepared was each evaluated in substantially the same manner as in Example 1, except that the electrolytic solution was prepared with 1 mole/1 lithium phosphofluoride($LiPF_6$) dissolved in a solvent mixture containing ethylene carbonate and diethyl carbonate in a volume ratio of 1:1.

Figure 7:
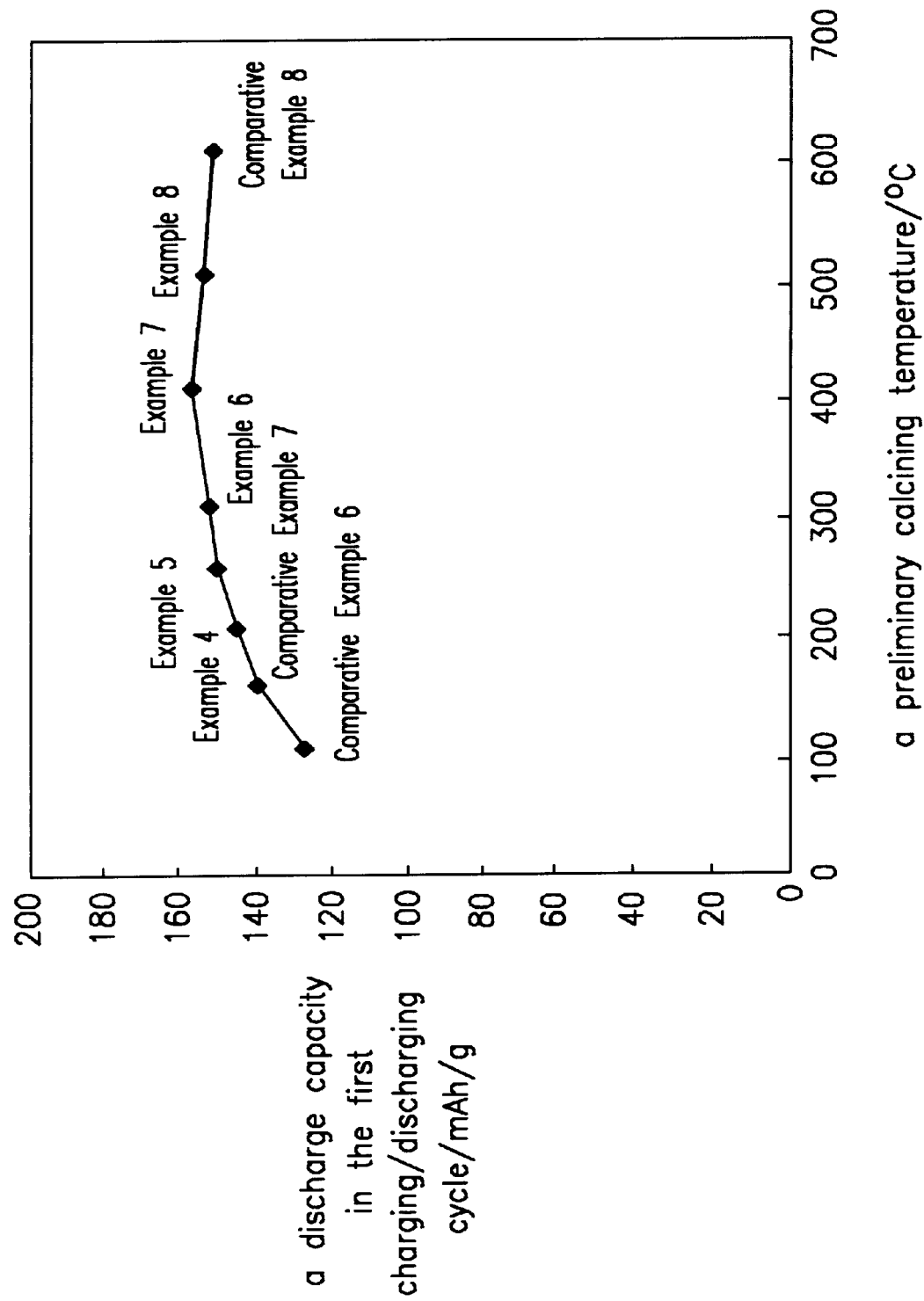
FIG. 7 shows a relationship between a preliminary calcining temperature and a discharge capacity in the first charging/discharging cycle using the positive electrode active material.

FIG. 7 shows the relationship between a preliminary calcining temperature and a discharge capacity in the first charging/discharging cycle.

According to FIG. 7, the discharge capacity of a high value was achieved when the preliminary calcining temperature was 200° C. or more. When the preliminary calcining temperature was 500° C. or more, the discharge capacity was constantly high and did not increase any more. Therefore, it is preferred that the preliminary calcination is conducted at 200° C. to 500° C.

Examples 9 to 11
Preparation of Positive Electrode Active Material $Li_xNiO_2$

Each of 0.30 mole of lithium acetate and 0.30 mole of acetic acid was dissolved in 100 ml of water and mixed to make a buffer solution in a molar ratio of 1:1. 0.030 mole of lithium hydroxide monohydrate and 0.030 mole of nickel acetate tetrahydrate were dissolved in the buffer solution with stirring. To this solution, 0.045 mole of oxalic acid powder was added to liberate a co-precipitate. Then, the resulting suspension was stirred for 2 hours at room temperature, and filtered to obtain co-precipitate. The isolated co-precipitate was dried. The dried co-precipitate (precursor) was preliminarily calcined in air for 10 hours at 400° C. In Example 9, the resulting substance was not cooled before the main calcination. In Example 10, the resulting substance was cooled, and then subjected to the main calcination. In Example 11, the resulting substance was cooled and pulverized in a mortar, and subjected to the main calcination. The main calcining step was carried out at 800° C. in an oxygen atmosphere for 2 hours, and the resulting product was pulverized. Thus, positive electrode active materials $Li_xNiO_2$ of Examples 9 to 11 were prepared.

Preparation and Evaluation of Electrodes

A positive electrode was prepared in substantially the same manner as in Example 1. The electrode thus prepared was each evaluated in substantially the same manner as in Example 1, except that the electrolytic solution was prepared with 1 mole/1 lithium perchlorate($LiClO_4$) dissolved in a solvent mixture containing propylene carbonate and diethyl carbonate in a ratio of 1:1 by volume.

As a result, the discharge capacity in the first charging/discharging cycle was 155 mAh/g, 160 mAh/g, 164 mAh/g in Examples 9 to 11, respectively.

As was apparent from the above result, it was noted that the battery having the high discharge capacity in the first charging/discharging cycle was obtained when the main calcination was conducted after the preliminary calcination followed by cooling or the main calcination was conducted after the preliminary calcination followed by cooling and pulverizing.

Examples 12 to 17 and Comparative Example 9 to 12
Preparation of Positive Electrode Active Material $Li_xNiO_2$ 0.50 mole of lithium acetate and 0.50 mole of acetic acid were respectively dissolved in 100 ml of water and mixed to make a buffer solution in a molar ratio of 1:1. 0.030 mole of lithium nitrate and 0.030 mole of nickel nitrate hexahydrate were dissolved in the buffer solution with stirring. To the resulting solution was added oxalic acid powder in different molar amounts of 1 mole(Comparative Example 9), 1.2 mole(Comparative Example 10), 1.3 mole(Examples 12), 1.4 mole(Example 13), 1.5 mole(Example 14), 1.8 mole (Example 15), 2.0 mole(Example 16), 2.5 mole(Example 17), 2.8 mole(Comparative Examples 11) and 3.0 mole (Comparative Examples 12) of with respect to one mole of nickel nitrate hexahydrate, to liberate a co-precipitate. Then, the resulting suspension was stirred for 2 hours at room temperature. This solution containing the co-precipitate was filtered and an obtained co-precipitate was dried. The dried co-precipitate (precursor) was preliminarily calcined in air for 10 hours at 500° C. The main calcining step was carried out at 700° C. in an oxygen atmosphere for 10 hours, and the resulting product were grinded to obtain a positive electrode active material $Li_xNiO_2$. The above-mentioned amounts of oxalic acid correspond in this order to Comparative Examples 9 and 10, Examples 12 to 17, Comparative Examples 11 and 12, respectively.

Preparation and Evaluation of Electrodes

Electrodes were prepared in substantially the same manner as in Example 1. The electrodes thus prepared were each evaluated in substantially the same manner as in Example 1, except that the electrolytic solution was prepared with 1 mole/l lithium perchlorate($LiClO_4$) dissolved in a solvent mixture containing ethylene carbonate and diethyl carbonate in a volume ratio of 1:1.

Figure 8:
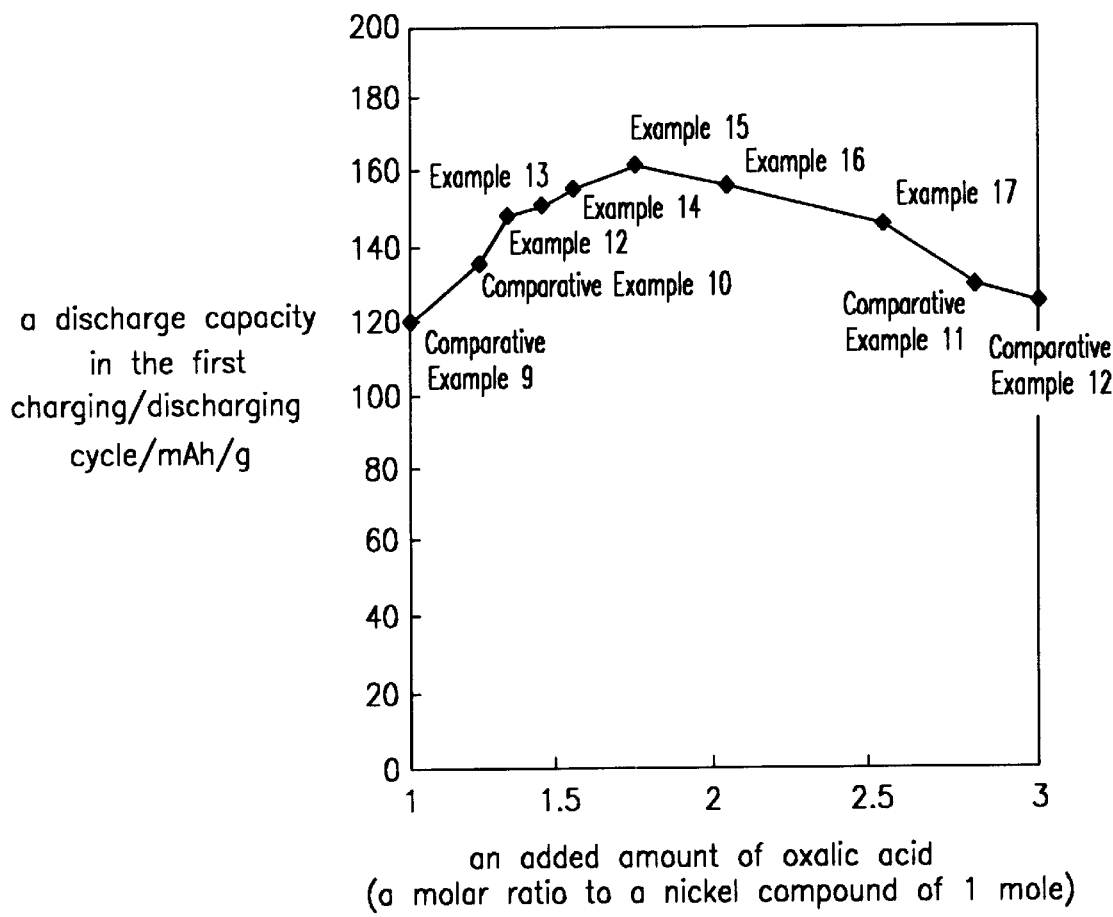
FIG. 8 shows a relationship between an amount of added oxalic acid and a discharge capacity in the first charging/discharging cycle using the positive electrode active material.

FIG. 8 shows the relationship between an amount of added oxalic acid and a discharge capacity in the first charging/discharging cycle.

According to FIG. 8, it is preferred that the amount of oxalic acid is 1.3 to 2.5 times as much as the amount of the nickel compound.

Examples 18 to 22

Preparation of Positive Electrode Active Material $Li_xNiO_2$ 0.30 mole of lithium acetate and 0.30 mole of acetic acid were respectively dissolved in 100 ml of water and mixed to make a buffer solution in a molar ratio of 1:1. Lithium hydroxide and nickel nitrate hexahydrate were weighed so as to make a molar ratio of lithium in lithium hydroxide to nickel in nickel nitrate 1.1:1 and dissolved in the buffer solution with stirring. To the resulting solution was added oxalic acid powder in different molar amounts of 1 mole (Example 18), 1.4 mole (Example 19), 1.55 mole (Examples 20), 1.6 mole (Example 21) and 2.0 mole (Example 22) of with respect to one mole of nickel nitrate hexahydrate, to liberate a co-precipitate. Then, the resulting suspension was stirred for 2 hours at room temperature. This solution containing the co-precipitate was filtered and an obtained co-precipitate was dried. X-ray diffraction analysis, ICP (Inductively Coupled Plasma) emission spectroscopic analysis and DTA-TG measurement were carried out on these dried co-precipitates (precursors) for evaluation. The above-mentioned amounts of oxalic acid correspond in this order to Examples 18 to 22, respectively.

Figure 9:
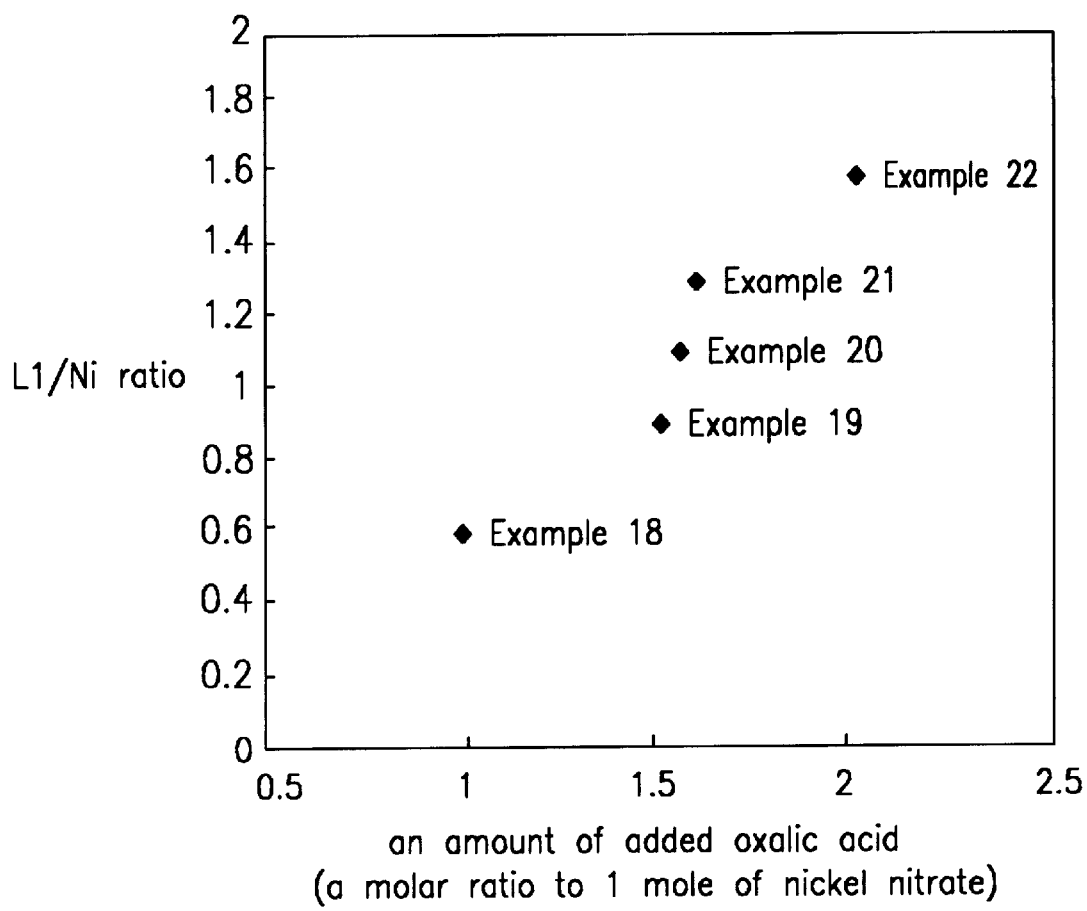
FIG. 9 shows a relationship between an amount of added oxalic acid (a molar ratio to 1 mole of nickel nitrate) and a ratio of lithium to nickel (Li/Ni) in a precursor.

FIG. 9 shows the relationship between an amount of added oxalic acid (a molar ratio to 1 mole of nickel nitrate) and a ratio of lithium to nickel (Li/Ni) in the precursor.

Figure 10:
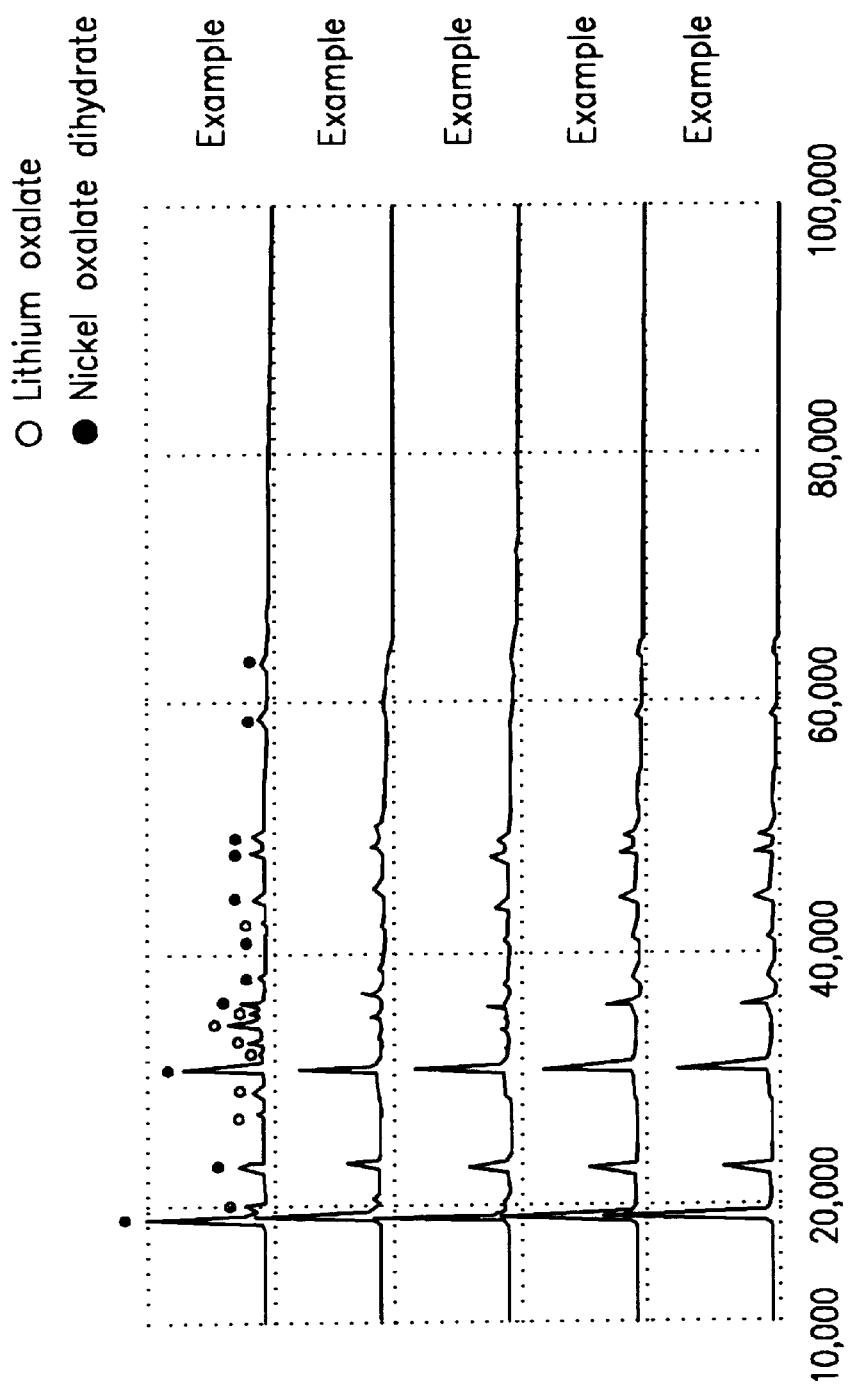
FIGS. 10(a) to 10(e) show graphic representations showing X-ray diffraction patterns of co-precipitates (precursors) prepared in accordance with Examples 18 to 22, respectively.
Figure 11:
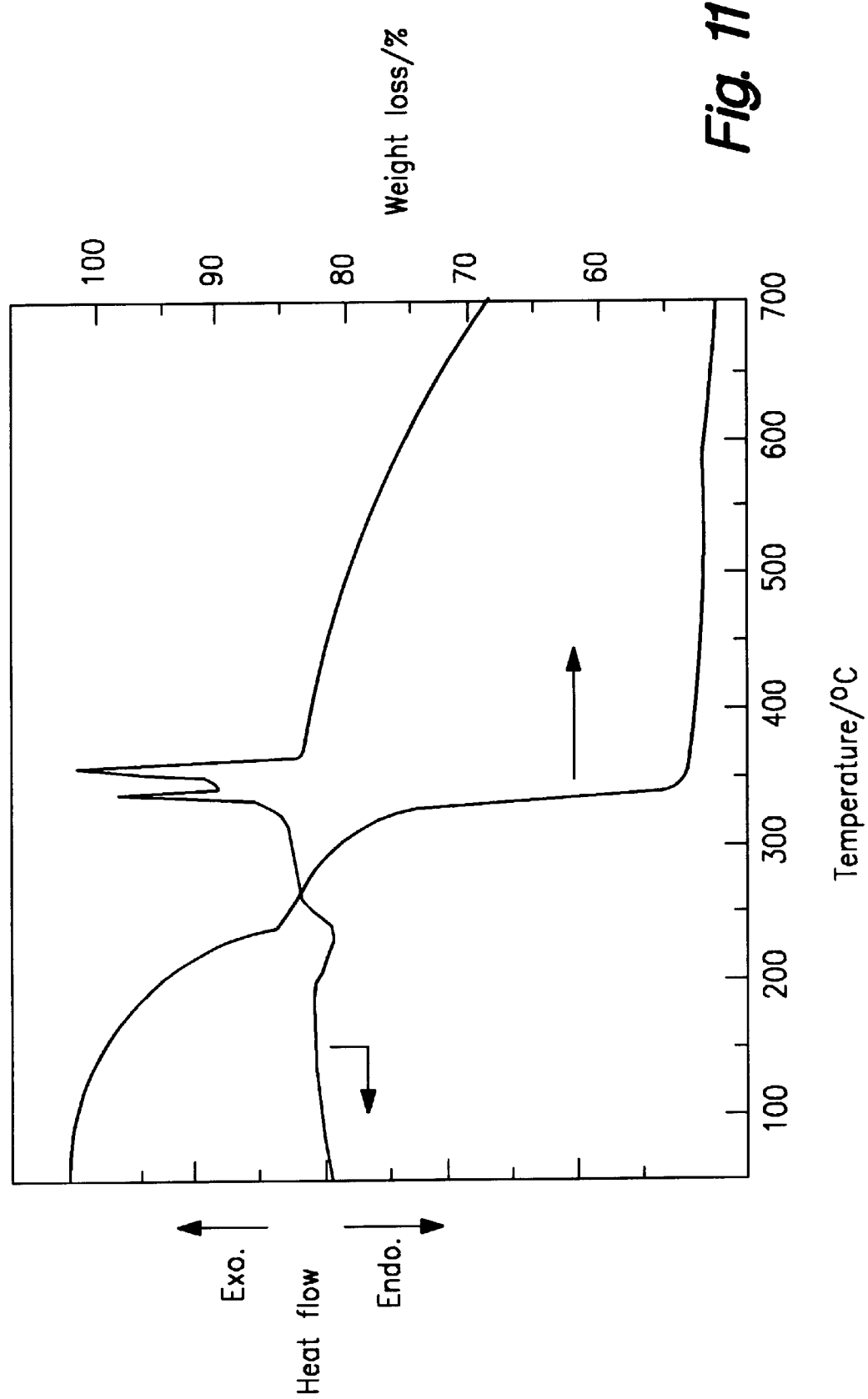
FIG. 11 shows a graphic representation showing a DTA-TG measurement result of a precursor prepared in accordance with Example 18.
Figure 12:
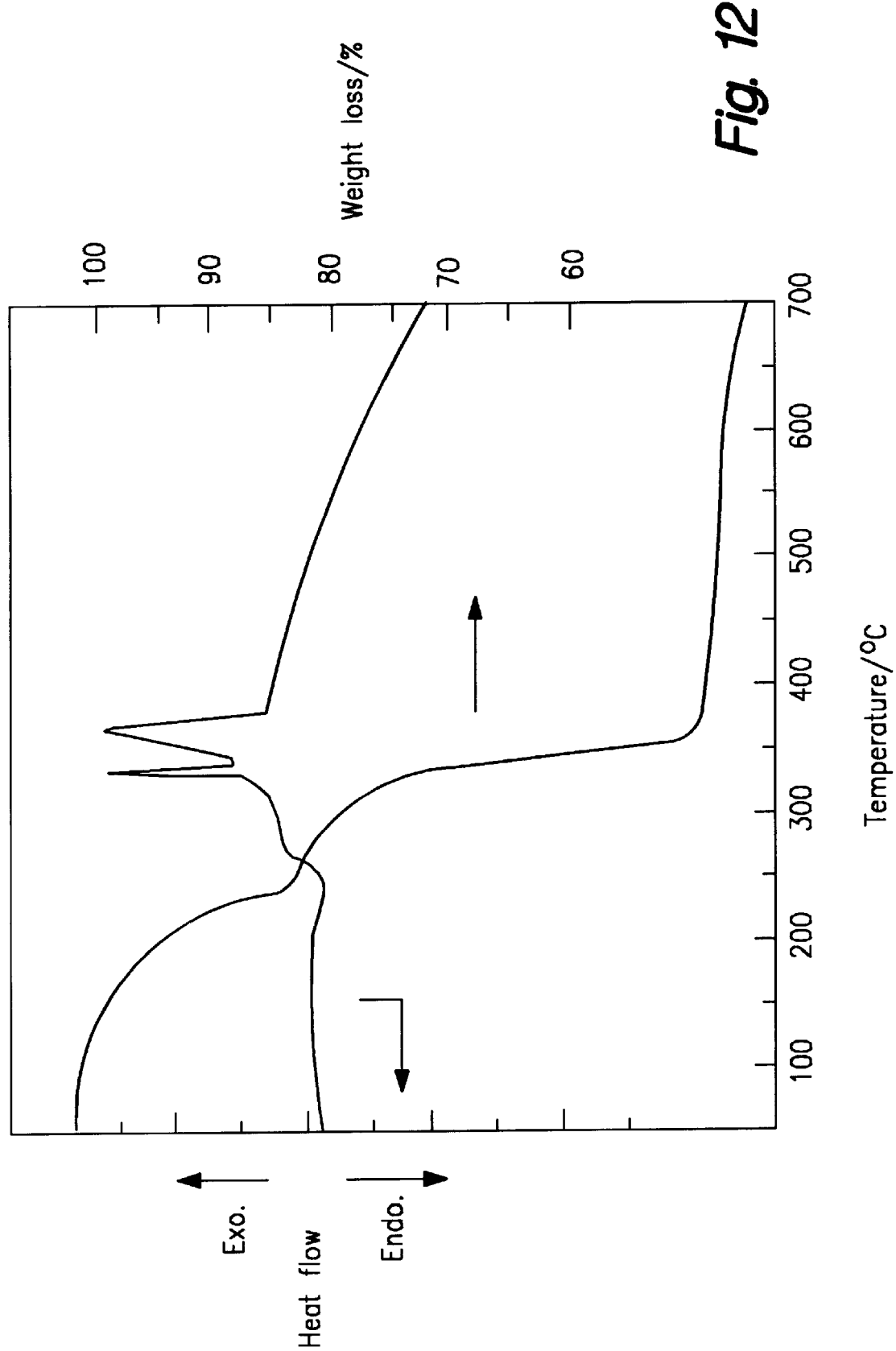
FIG. 12 shows a graphic representation showing a DTA-TG measurement result of a precursor prepared in accordance with Example 19.
Figure 13:
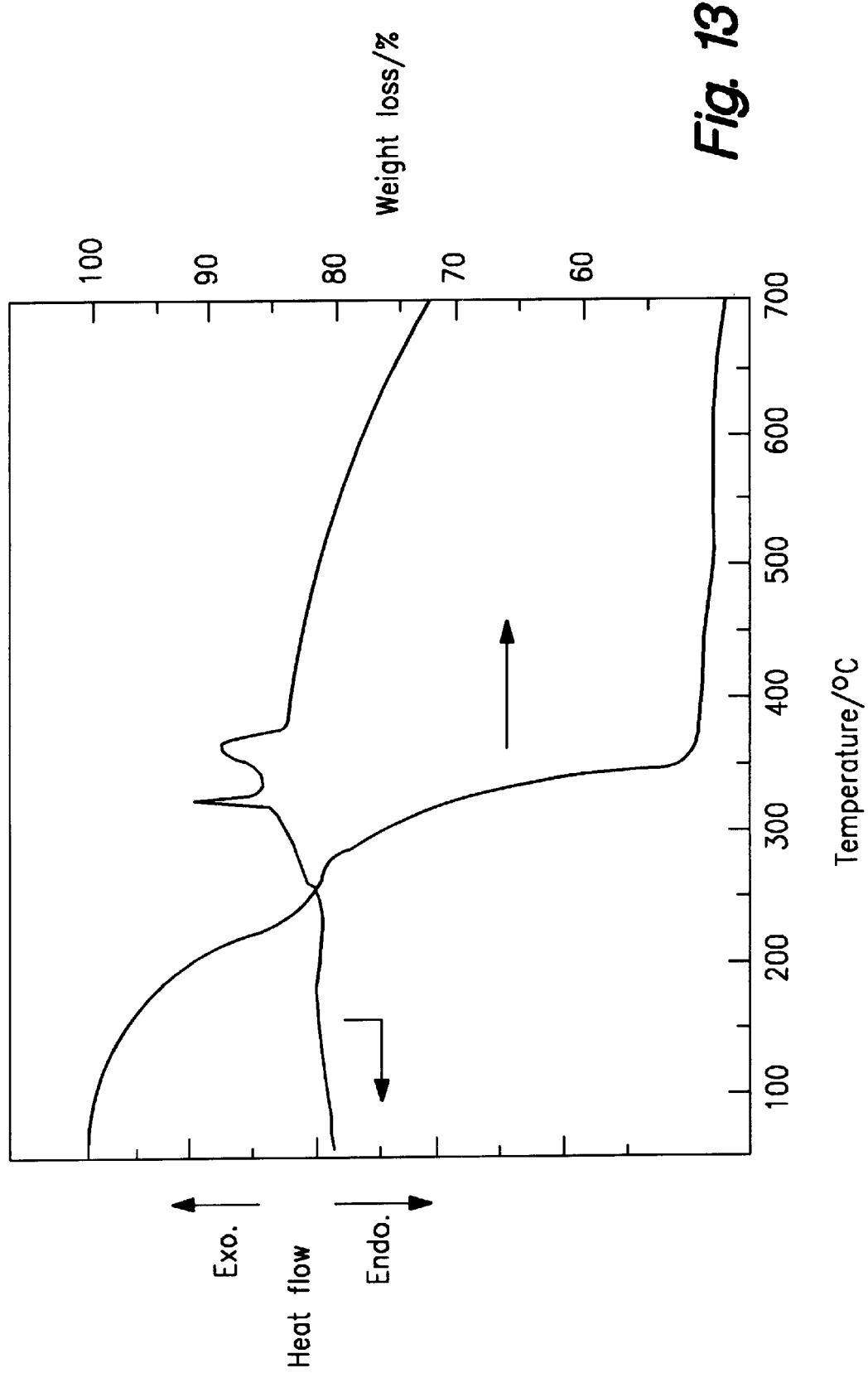
FIG. 13 shows a graphic representation showing a DTA-TG measurement result of a precursor prepared in accordance with Example 20.
Figure 14:
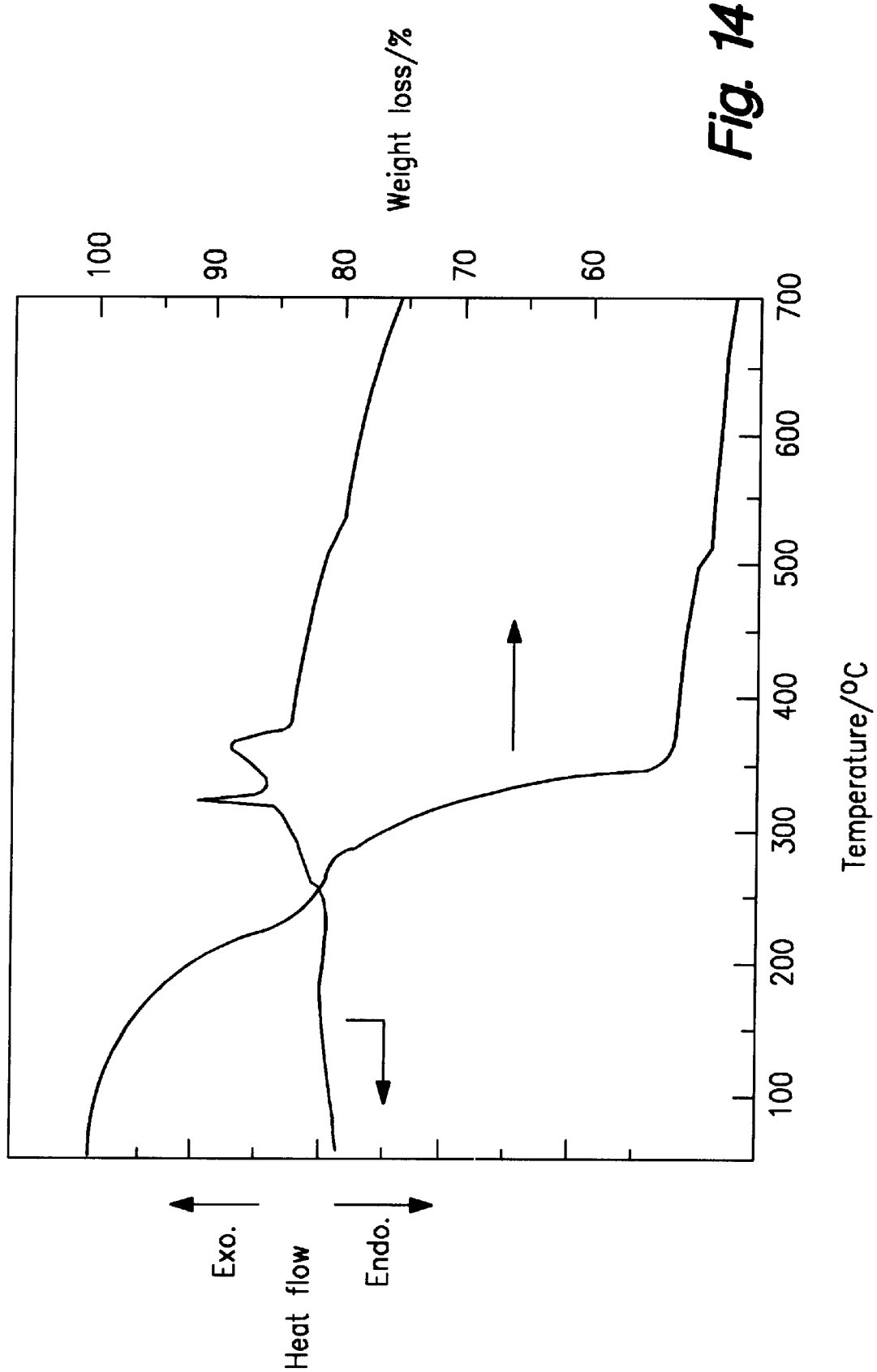
FIG. 14 shows a graphic representation showing a DTA-TG measurement result of a precursor prepared in accordance with Example 21.
Figure 15:
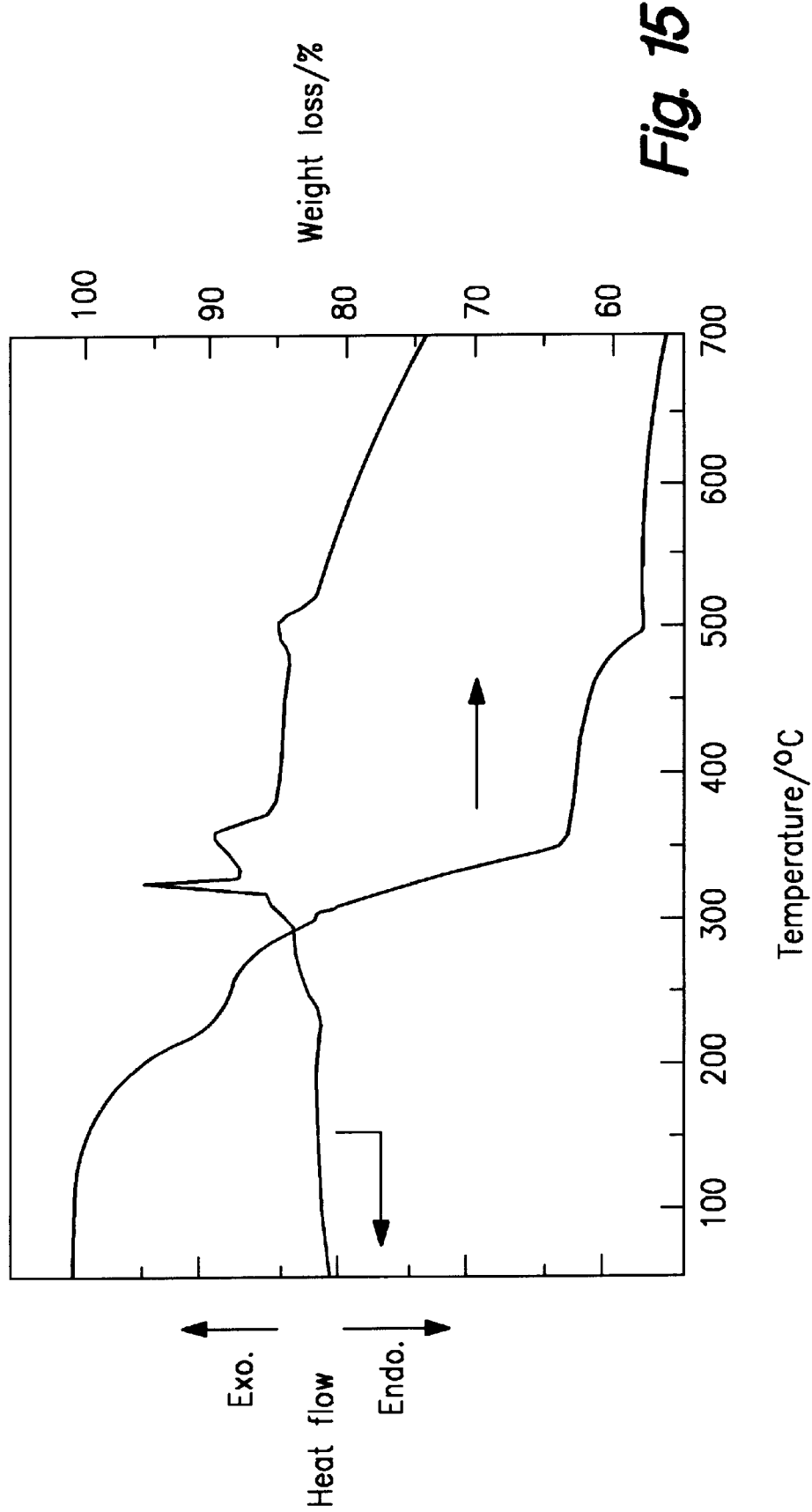
FIG. 15 shows a graphic representation showing a DTA-TG measurement result of a precursor prepared in accordance with Example 22.

FIGS. 10(*a*) to 10(*e*) show graphic representations showing X-ray diffraction patterns of the precursors prepared in accordance with Examples 18 to 22, respectively;

FIGS. 11 to 15 show graphic representations showing a DTA-TG measurement result of the precursor prepared in accordance with Examples 18 to 22, respectively.

According to FIG. 9, the more oxalic acid was added, the higher the ratio of lithium to nickel (Li/Ni) in the precursor became.

According to FIGS. 10(*a*) and 10(*b*), diffraction peaks were observed only for nickel oxalate in the cases of Example 18 and 19, respectively. On the other hand, diffraction peaks were observed for both nickel oxalate and lithium oxalate, and the higher the molar ratio of lithium to nickel in the precursors was, the more the relative intensity ratio of lithium oxalate to nickel oxalate grew in the case of Examples 20 to 22.

According to FIGS. 11 to 15, two thermal decomposition peaks of nickel oxalate and a composite oxalate of lithium and nickel was observed around 300–350° C. for all the Examples. Loss in weight due to thermal decomposition of lithium oxalate around 500° C. was not clearly observed in Examples 18 and 19. However, loss in weight due to thermal decomposition of lithium oxalate was observed in Examples 20 to 22. The higher the molar ratio of lithium to nickel (Li/Ni) in the precursor was, the higher the weight loss ratio became.

These analyses showed that when the Li/Ni ratio in the precursors was small, lithium oxalate did not exist. As the Li/Ni ratio increased, the molar amount of lithium oxalate in the precursor increased. For the above reasons, it is found that lithium and nickel are the more uniformly mixed in the precursor because of the presence of the composite oxalate of lithium and nickel.

The precursors were preliminarily calcined in air for 2 hours at 400° C. The resulting substances were cooled and pulverized in a mortar, and subjected to the main calcination. The main calcining step was carried out at 700° C. in an oxygen atmosphere for 10 hours, and the resulting products were grinded to obtain positive electrode active materials $Li_xNiO_2$.

Preparation and Evaluation of Electrodes

Electrodes were prepared from the positive electrode active materials of Examples 19 and 20 in substantially the same manner as in Example 1. The electrodes thus prepared were each evaluated in substantially the same manner as in Example 1, except that the electrolytic solution was prepared with 1 mole/l lithium perchlorate($LiClO_4$) dissolved in a solvent mixture containing ethylene carbonate and diethyl carbonate in a volume ratio of 1:1.

The discharge capacity in the first charging/discharging cycle of Example 19 was 170 mAh/g. As was apparent from the result, it was noted that the process of producing $Li_xNiO_2$ from a material consisting of a composite oxalate of lithium and nickel as a precursor provided an excellent charge/discharge capacity.

The discharge capacity in the first charging/discharging cycle of Example 20 was 190 mAh/g. As was apparent from the result, it was noted that the process of producing $Li_xNiO_2$ from a material consisting of nickel oxalate, lithium oxalate, and a composite oxalate of lithium and nickel provided an excellent charge/discharge capacity.

Examples 23 to 26 and Comparative Examples 13 to 16

Preparation of Positive Electrode Active Material $Li_xNi_{1-y}M_yO_2$ 0.30 mole of lithium acetate and 0.30 mole of acetic acid were respectively dissolved in 100 ml of water and mixed to make a buffer solution in a molar ratio of 1:1. To the buffer solution was added a mixture of lithium nitrate, nickel nitrate hexahydrate and cobalt nitrate hexahydrate in different molar ratios (Li:Ni:Co) of 1.1:0.9:0.1(Example 23), 1.1:0.8:0.2(Example 24), 1.1:0.7:0.3(Example 25) and 1.1:0.6:0.4(Example 26) were dissolved in the buffer solution and stirred. To this solution, oxalic acid powder was added to liberate a co-precipitate. Then, the resulting suspension was stirred for 2 hours at room temperature. This solution containing the co-precipitate was filtered and the obtained co-precipitate was dried. The dried co-precipitate (precursor) was preliminarily calcined in air for 10 hours at 500° C. The main calcination was conducted in an oxygen atmosphere for 2 hours at 800° C., and the resulting product was grinded to obtain $Li_xNi_{1-y}Co_yO_2$ (y=0.1, 0.2, 0.3, 0.4) as a positive electrode active material. The above-mentioned weight ratios of lithium nitrate, nickel nitrate hexahydrate and cobalt nitrate hexahydrate correspond in this order to Examples 23 to 26, respectively.

Preparation and Evaluation of Electrodes

A positive electrodes was prepared in substantially the same manner as in Example 1. The electrode thus prepared was each evaluated in substantially the same manner as in Example 1, except that the electrolytic solution was prepared with 1 mole/l lithium perchlorate($LiClO_4$) dissolved in a solvent mixture containing ethylene carbonate and diethyl carbonate in a volume ratio of 1:1.

As a result, the discharge capacity in the first charging/discharging cycle was 160 mAh/g, 164 mAh/g, 168 mAh/g and 165 mAh/g in Examples 23 to 26, respectively.

Further, various main calcination temperatures were examined in the case that the Li:Ni:Co ratio was 1.1:0.8:0.2 and similar results shown as in FIG. 3 were obtained. Various volume ratios of an oxygen concentration in a main calcining atmosphere were examined in the case that the Li:Ni:Co ratio was 1.1:0.8:0.2 and similar results shown as in FIG. 4 were obtained. Various preliminary calcination temperatures were examined in the case that the Li:Ni:Co ratio was 1.1:0.8:0.2 and similar results shown as in FIG. 7 were obtained.

Comparative Example 13

Preparation of Positive Electrode Active Material $Li_xNi_{1-y}M_yO_2$

Lithium hydroxide, nickel oxyhydroxide (NiOOH) and cobalt oxide($Co_3O_4$) were weighed in a ratio of Li:Ni:Co=1.1:0.8:0.2, and mixed in a mortar. A pressure of 100 kg/cm$^2$ was applied to the mixture to press-mold into a pellet. The pellet was calcined at 800° C. in an oxygen atmosphere for 2 hours to obtain $LiNi_{0.8}Co_{0.2}O_2$ as a positive electrode active material.

Preparation and evaluation of electrodes

A positive electrode was prepared and evaluated in the same manner as in Example 1. The discharge capacity in the first charging/discharging cycle was 138 mAh/g.

Comparative Example 14

Preparation of Positive Electrode Active Material $Li_xNi_{1-y}M_yO_2$

Lithium hydroxide, nickel chloride and cobalt chloride were weighed in a ratio of Li:Ni:Co=1.1:0.8:0.2, and each was dissolved in water. The aqueous solution of nickel chloride and the aqueous solution of cobalt chloride were mixed. The aqueous solution of lithium hydroxide was added thereto little by little with stirring. The solution mixture was continuously stirred at 30° C. for 5 hours and then dried at 90° C. to 100° C. The resulting solid substance was pulverized and a pressure of 100 kg/cm$^2$ was applied to the mixture to press-mold into a pellet. The pellet was calcined at 800° C. in an oxygen atmosphere for 2 hours to obtain $LiNi_{0.8}Co_{0.2}O_2$ as a positive electrode active material.

Preparation and Evaluation of Electrode

A positive electrode was prepared and evaluated in the same manner as in Example 1. The discharge capacity in the first charging/discharging cycle was 135 mAh/g.

Comparative Example 15

Preparation of Positive Electrode Active Material $Li_xNi_{1-y}M_yO_2$

Lithium hydroxide, nickel hydroxide and cobalt oxide ($Co_3O_4$) were weighed in a ratio of Li:Ni:Co=1.1:0.8:0.2, and mixed in a mortar with a small amount of water as a dispersion medium. The mixture was dried at 90° C. to 100° C. The resulting solid substance was pulverized and a pressure of 100 kg/cm$^2$ was applied to the mixture to press-mold into a pellet. The pellet was calcined at 800° C. in an oxygen atmosphere for 2 hours to obtain $LiNi_{0.8}Co_{0.2}O_2$ as a positive electrode active material.

Preparation and evaluation of electrode

A positive electrode was prepared and evaluated in the same manner as in Example 1. The discharge capacity in the first charging/discharging cycle was 133 mAh/g.

Comparative Example 16

Preparation of Positive Electrode Active Material $Li_xNi_{1-y}M_yO_2$

Lithium chloride,, nickel oxide(NiO) and cobalt oxide ($Co_3O_4$) were weighed in a ratio of Li:Ni:Co=1.1:0.8:0.2. Lithium chloride was dissolved in water. Nickel oxide and cobalt oxide were mixed, and then the aqueous solution of lithium chloride was added thereto little by little with kneading. The resulting mixture was continuously kneaded at 30° C. for 5 hours and then dried at 90° C. to 100° C. The resulting solid substance was pulverized and then pressure of 100 kg/cm$^2$ was applied to the mixture to press-mold into a pellet. The pellet was calcined at 800° C. in an oxygen atmosphere for 2 hours to obtain $LiNi_{0.8}Co_{0.20}O_2$ as a positive electrode active material.

Preparation and evaluation of electrode

A positive electrode was prepared and evaluated in the same manner as in Example 1. The discharge capacity in the first charging/discharging cycle was 137 mAh/g.

As was apparent from a comparison between Examples 18 to 21 and Comparative Examples 13 to 16, according to the process of the present invention, lithium, nickel and cobalt were more uniformly mixed before the calcination and therefore the discharge capacity was improved.

Examples 27 to 30 and Comparative Examples 17 to 20

Preparation of Positive Electrode Active Material $Li_xNi_{1-y}M_yO_2$ 0.30 mole of lithium acetate and 0.30 mole of acetic acid were respectively dissolved in 100 ml of water and mixed to make a buffer solution in a molar ratio of 1:1. To the resulting solution was added a mixture of lithium nitrate, nickel nitrate hexahydrate and aluminum nitrate nonahydrate in different molar ratios (Li:Ni:Al) of 1.1:0.95:0.05 (Example 27), 1.1:0.9:0.1(Example 28), 1.1:0.85:0.15 (Example 29) and 1.1:0.8:0.2(Example 30), respectively. Then, they were dissolved in the buffer solution and stirred. To this buffer, oxalic acid powder was added to liberate a co-precipitate. Then, the resulting suspension was stirred for 2 hours at room temperature. This buffer solution containing the co-precipitate was filtered and the obtained co-precipitate was dried. The dried co-precipitate (precursor) was preliminarily calcined in air for 10 hours at 500° C. The main calcination was conducted in an oxygen atmosphere for 2 hours at 800° C., and the resulting product was grinded to obtain a positive electrode active material $Li_xNi_{1-y}Al_yO_2$. The above-mentioned molar ratio of lithium nitrate, nickel nitrate hexahydrate and aluminum nitrate nonahydrate correspond in this order to Examples 27 to 30, respectively.

Preparation and Evaluation of Electrodes

A positive electrode was prepared in substantially the same manner as in Example 1. The electrode thus prepared was each evaluated in substantially the same manner as in Example 1, except that the electrolytic solution was prepared with 1 mole/1 lithium perchlorate(LiClO$_4$) dissolved in a solvent mixture containing ethylene carbonate and diethyl carbonate in a ratio of by volume 1:1.

As a result, the discharge capacity in the first charging/discharging cycle was 159 mAh/g, 162 mAh/g, 158 mAh/g and 160 mAh/g in Examples 27 to 30, respectively.

Further, various main calcination temperatures were examined in the case that the Li:Ni:Al ratio was 1.1:0.9:0.1 and similar results shown as in FIG. 3 were obtained. Various volume ratios of an oxygen concentration in a main calcining atmosphere were examined in the case that the Li:Ni:Al ratio was 1.1:0.9:0.1 and similar results shown as in FIG. 4 were obtained. Various preliminary calcination temperature were examined in the case that the Li:Ni:Al ratio was 1.1:0.9:0.1 and similar results shown as in FIG. 7 were obtained.

Comparative Example 17

Preparation of Positive Electrode Active Material $Li_xNi_{1-y}M_yO_2$

Lithium hydroxide, nickel oxyhydroxide (NiOOH) and aluminum oxide(Al$_2$O$_3$) were weighed in a ratio of Li:Ni:Al=1.1:0.9:0.1, and were mixed in a mortar. A pressure of 100 kg/cm$^2$ was applied to the mixture to press-mold into a pellet. The pellet was calcined at 800° C. in an oxygen atmosphere for 2 hours to obtain LiNi$_{0.9}$Al$_{0.1}$O$_2$ as a positive electrode active material.

Preparation and Evaluation of Electrodes

A positive electrode was prepared and evaluated in the same manner as in Example 1. The discharge capacity in the first charging/discharging cycle was 125 mAh/g.

Comparative Example 18

Preparation of Positive Electrode Active Material $Li_xNi_{1-y}M_yO_2$

Lithium hydroxide, nickel chloride and aluminum chloride were weighed in a ratio of Li:Ni:Al=1.1:0.9:0.1, and each was dissolved in water. The aqueous solution of nickel chloride and the aqueous solution of aluminum chloride were mixed. The aqueous solution of lithium hydroxide was added thereto little by little with stirring. The solution mixture was continuously stirred at 30° C. for 5 hours and then dried at 90° C. to 100° C. The resulting solid substance was pulverized and then a pressure of 100 kg/cm$^2$ was applied to the substance to press-mold into a pellet. The pellet was calcined at 800° C. in an oxygen atmosphere for 2 hours to obtain LiNi$_{0.9}$Al$_{0.1}$O$_2$ as a positive electrode active material.

Preparation and Evaluation of Electrode

A positive electrode was prepared and evaluated in the same manner as in Example 1. The discharge capacity in the first charging/discharging cycle was 130 mAh/g.

Comparative Example 19

Preparation of Positive Electrode Active Material $Li_xNi_{1-y}M_yO_2$

Lithium hydroxide, nickel hydroxide and aluminum oxide (Al$_2$O$_3$) were weighed in a ratio of Li:Ni:Al=1.1:0.9:0.1, and mixed in a mortar with a small amount of water as a dispersion medium. The mixture was dried at 90° C. to 100° C. The resulting solid substance was pulverized and then a pressure of 100 kg/cm$^2$ was applied to the substance to press-mold into a pellet. The pellet was calcined at 800° C. in an oxygen atmosphere for 2 hours to obtain LiNi$_{0.9}$Al$_{0.1}$O$_2$ as a positive electrode active material.

Preparation and Evaluation of Electrode

A positive electrode was prepared and evaluated in the same manner as in Example 1. The discharge capacity in the first charging/discharging cycle was 121 mAh/g.

Comparative Example 20

Preparation of Positive Electrode Active Material $Li_xNi_{1-y}M_yO_2$

Lithium chloride, nickel oxide(NiO) and aluminum oxide (Al$_2$O$_3$) were weighed in a ratio of Li:Ni:Al=1.1:0.9:0.1. Lithium chloride was dissolved in water. Nickel oxide and aluminum oxide were mixed, and then the aqueous solution of lithium chloride was added thereto little by little with kneading. The resulting mixture was continuously kneaded at 30° C. for 5 hours and then dried at 90° C. to 100° C. The resulting solid substance was pulverized and then a pressure of 100 kg/cm$^2$ was applied to the substance to press-mold into a pellet. The pellet was calcined at 800° C. in an oxygen atmosphere for 2 hours to obtain LiNi$_{0.9}$Al$_{0.1}$O$_2$ as a positive electrode active material.

Preparation and evaluation of electrode

A positive electrode was prepared and evaluated in the same manner as in Example 1. The discharge capacity in the first charging/discharging cycle was 128 mAh/g.

As was apparent from a comparison between Examples 27 to 30 and Comparative Examples 17 to 20 it was noted that, in accordance with the process of the present invention, lithium, nickel and aluminum were more uniformly mixed before the calcination and the discharge capacity of the battery was improved.

As mentioned hereinabove, in the process for the manufacture of the positive electrode active material in accordance with the present invention, a mixture of a lithium compound and a nickel compound is prepared by a co-precipitation reaction in a buffer solution and, therefore, the resulting co-precipitate is in such a state that lithium and nickel are well homogeneously mixed. Also each amount of lithium and nickel in the co-precipitate may be controlled without difficulties. Moreover, more homogeneously mixed co-precipitate (precursor) of $Li_xNiO_2$ and $Li_xN_{1-y}M_yO_2$ can be obtained. Precisely, this co-precipitate (precursor) contains a composite oxalate of lithium and nickel or this co-precipitate contains nickel oxalate, lithium oxalate, and a composite oxalate of lithium and nickel.

In the positive electrode of the present invention where the positive electrode active material obtained by calcining the homogeneous mixture of lithium and nickel (precursor) is used, it is now possible to achieve an initial discharge capacity of a high value of 149 mAh/g or more. In addition, this electrode of a secondary battery hardly deteriorate upon repeated charging/discharging operations and the secondary battery having a long life is achieved. Further, the performance of a lithium ion secondary battery using the positive electrode active material according to the present invention may be improved.

What is claimed is:

1. A process of preparing a positive electrode active material for a nonaqueous secondary battery, comprising:
   making a buffered aqueous solution of a water-soluble lithium compound and a water-soluble nickel compound,
   reacting the buffered aqueous solution with oxalic acid to yield a co-precipitate of a salt of lithium and nickel in the resulting aqueous solution.

2. A process according to claim 1, wherein the buffered aqueous solution contains a water-soluble compound of an element selected from the group consisting of transition metals and elements of the group 2B, 3B, 4B and 5B(except Ni) in addition to the water-soluble lithium compound and the water-soluble nickel compound.

3. A process according to claim 1, wherein the buffered aqueous solution is prepared by mixing an aqueous solution of the water-soluble lithium compound and the water-soluble nickel compound with a buffer solution.

4. A process according to claim 1, wherein the buffered aqueous solution is prepared by dissolving the water-soluble lithium compound and the water-soluble nickel compound in a buffer solution.

5. A process according to claim 1, wherein the co-precipitate is further isolated and calcined.

6. A process of preparing a positive electrode active material for a nonaqueous secondary battery, comprising:

dissolving a water-soluble lithium compound and a water-soluble nickel compound in a buffer solution to prepare a uniform aqueous solution, adding oxalic acid to the aqueous solution to co-precipitate a lithium salt and nickel salt, isolating the obtained co-precipitate, and calcining the isolated co-precipitate.

7. A process according to claim 6, wherein the water-soluble lithium compound is a compound selected from the group consisting of lithium hydroxide, lithium sulfate, lithium nitrate, lithium chloride, lithium bromide, lithium iodide and lithium acetate.

8. A process according to claim 6, wherein the water-soluble nickel compound is a compound selected from the group consisting of nickel sulfate, nickel nitrate, nickel chloride, nickel bromide, nickel iodide and nickel acetate.

9. A process according to claim 6, wherein the buffer solution contains an organic acid and its lithium salt.

10. A process according to claim 9, wherein the buffer solution contains acetic acid and lithium acetate.

11. A process according to claim 6, wherein the co-precipitate comprises a composite oxalate of lithium and nickel.

12. A process according to claim 11, wherein the co-precipitate shows an X-ray diffraction pattern similar to an X-ray diffraction pattern of nickel oxalate, when using the same X-ray source.

13. A process according to claim 11, wherein the co-precipitate shows two thermal decomposition peaks around 300–350° C. in DTA-TG measurement.

14. A process according to claim 6, wherein the co-precipitate comprises a mixture of nickel oxalate, lithium oxalate and a composite oxalate of lithium and nickel.

15. A process according to claim 14, wherein the co-precipitate shows an X-ray diffraction pattern corresponding to that of nickel oxalate, lithium oxalate and the composite oxalate of lithium and nickel, when using the same X-ray source.

16. A process according to claim 14, wherein the co-precipitate shows two thermal decomposition peaks around 300–350° C. corresponding to that of nickel oxalate and the composite oxalate of lithium and nickel and a thermal decomposition peak around 500° C. corresponding to that of lithium oxalate in DTA-TG measurement.

17. A process according to claim 6, wherein the co-precipitate shows an X-ray diffraction pattern shown in one of FIGS. 10(a) to 10(e), when using the same X-ray source.

18. A process according to claim 6, wherein a molar amount of oxalic acid added to the aqueous solution is 1.3 to 2.5 times as much as a molar amount of the water-soluble nickel compound contained in the aqueous solution.

19. A process according to claim 9, wherein a molar amount of the organic acid and a molar amount of its lithium salt are each 3 to 30 times as much as a molar amount of the water-soluble nickel compound contained in the aqueous solution.

20. A process according to claim 6, wherein the calcination is conducted at a temperature of 650° C. to 900° C.

21. A process according to claim 6, wherein the calciniating atmosphere is air or an atmosphere containing oxygen in a concentration of 20% or more by volume.

22. A process according to claim 6, wherein the co-precipitate is preliminary calcined before the calcination.

23. A process according to claim 22, wherein the positive electrode active material to be calcined after the preliminary calcination is cooled or grinded after being cooled.

24. A process according to claim 6, wherein the positive electrode active material is $Li_xNiO_2$ ($0.8 \leq X \leq 1.2$).

25. A process according to claim 6, wherein another water-soluble compound containing an element selected from the group consisting of transition metals and elements of the group 2B, 3B, 4B and 5B (except Ni) is added to the buffer solution.

26. A process according to claim 25, wherein the positive electrode active material is $Li_xNi_{1-y}M_yO_2$ ($0.8 \leq X \leq 1.2$, $0<Y<0.5$, M: an element selected from the group consisting of transition metals and elements of the group 2B, 3B, 4B and 5B (except Ni)).

27. A process according to claim 1, wherein a buffer solution comprising an organic acid and its lithium salt is used to make the buffered aqueous solution containing the water-soluble lithium compound and a water-soluble nickel compound.

28. A process according to claim 1, wherein a buffer solution comprising a first organic acid and a lithium salt of a second organic acid, which may be the same or different than the first organic acid, is used to make the buffered aqueous solution containing the water-soluble lithium compound and a water-soluble nickel compound.

29. A process according to claim 6, wherein the buffer solution comprises a first organic acid and a lithium salt of a second organic acid, which may be the same or different than the first organic acid.

* * * * *